US011295238B2

(12) United States Patent
Tabuchi

(10) Patent No.: US 11,295,238 B2
(45) Date of Patent: Apr. 5, 2022

(54) DATA ORCHESTRATION PLATFORM MANAGEMENT

(71) Applicant: AllegroSmart Inc., Hiroshima (JP)

(72) Inventor: Narutoshi Tabuchi, Tokyo (JP)

(73) Assignee: AllegroSmart Inc.

( * ) Notice: Subject to any disclaimer, the term of this patent is extended or adjusted under 35 U.S.C. 154(b) by 586 days.

(21) Appl. No.: 16/223,151

(22) Filed: Dec. 18, 2018

(65) Prior Publication Data

US 2019/0244129 A1 Aug. 8, 2019

(30) Foreign Application Priority Data

Feb. 3, 2018 (JP) .............................. JP2018-017735

(51) Int. Cl.
*G06N 20/00* (2019.01)
*H04L 29/08* (2006.01)
*H04L 67/12* (2022.01)

(52) U.S. Cl.
CPC .............. *G06N 20/00* (2019.01); *H04L 67/12* (2013.01)

(58) Field of Classification Search
CPC .............................. G06N 20/00; G06N 7/005
See application file for complete search history.

(56) References Cited

U.S. PATENT DOCUMENTS

| 6,601,026 B2 * | 7/2003 | Appelt | G06F 16/3338 |
| | | | 704/9 |
| 7,216,179 B2 * | 5/2007 | Ott | H04L 29/06 |
| | | | 709/227 |
| 8,280,009 B2 * | 10/2012 | Stepanian | H04M 1/72415 |
| | | | 379/1.01 |
| 2014/0244834 A1 * | 8/2014 | Guedalia | H04W 4/21 |
| | | | 709/224 |
| 2015/0019714 A1 | 1/2015 | Shaashua et al. | |

* cited by examiner

*Primary Examiner* — Robert G Bachner
(74) *Attorney, Agent, or Firm* — Harness, Dickey & Pierce, P.L.C.

(57) ABSTRACT

Aspects of the disclosure relate to data orchestration platform management in a network communication environment including a set of information sources. A set of raw data may be ingested using the set of information sources. A set of interpreted data that indicates a set of attributes of the network communication environment may be generated using a data interpretation dictionary configured to analyze the set of raw data. An artificial intelligence (AI) logic unit to perform processing with respect to the set of interpreted data may be determined using a data orchestration platform management engine to analyze the set of attributes of the network communication environment. The set of interpreted data may be processed using the AI logic unit.

20 Claims, 9 Drawing Sheets

DATA ORCHESTRATION PLATFORM MANAGEMENT

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATION

The present invention claims priority to Japanese Patent Application No. 2018-017735 filed Feb. 3, 2018, the disclosure of which is incorporated by reference herein.

FIELD OF THE INVENTION

The present disclosure relates generally to computer systems, and more particularly relates to data orchestration platform management in a network communication environment including a set of information sources.

BACKGROUND OF THE INVENTION

In recent years, network communication environments (e.g., Internet of Things networks, sensor networks, big data networks) have expanded to support functionality for a wide variety of applications. For example, network communication environments may include sensors for monitoring natural phenomena (e.g., temperature, pressure, humidity, precipitation, seismic activity), transportation (e.g., urban mapping, traffic flow, vehicle parking), industrial productivity (e.g., factory efficiency, power usage), security (e.g., intrusion detection, crime prevention) and more. As the functions and applications of network communication environments increase, so too does the overhead of appropriately configuring these sensors and correctly interpreting the data they provide.

Aspects of the disclosure relate to the recognition that, in present network communication environments containing a large number of data sources (e.g., sensor devices), different data sources may collect, format, and transmit raw data in different ways. For example, some data sensors may transmit collected measurements in a binary format, others may format measurements in hexadecimal, and still others may use a proprietary format for structuring raw data. As such, it is necessary for users to manually configure each data source (e.g., sensor device), interpret the data collected by the data sources, and subsequently choose AI logic units to process the collected data. For example, Patent Document 1 discloses a technique for requesting a semantic label from a user to interpret data received by a device in an Internet of Things environment. Patent Document 1, however, does not disclose a method for dynamically interpreting data and determining appropriate AI logic units to process the interpreted data, and as such a user must be relied upon to acquire the information needed to interpret the raw data ingested from sensors in the network communication environment.

SUMMARY OF THE INVENTION

Accordingly, it is an object of the present invention to interpret raw data ingested from a wide variety of data sources and dynamically determine appropriate AI logic units for processing the interpreted data.

Accordingly, aspects of the present disclosure relate to a data orchestration platform configured to interpret raw data ingested from a wide variety of data sources in a dynamic and automated fashion without user intervention. The data orchestration platform may leverage a data interpretation dictionary in tandem with a machine learning technique in order to interpret data regardless of the data source from which it was received. Subsequently, a machine learning model may govern selection of appropriate AI logic units to process the interpreted data based on the attributes with which the interpreted data is associated. Based on the results of the processing by the AI logic unit, a management operation may be performed with respect to the network communication environment to facilitate performance, efficiency, and reliability of subsequent data collection operations.

Aspects of the disclosure relate to a computer-implemented method for data orchestration platform management in a network communication environment including a set of information sources, the method comprising ingesting, from the set of information sources, a set of raw data, generating, using a data interpretation dictionary configured to analyze the set of raw data, a set of interpreted data that indicates a set of attributes of the network communication environment, determining, using a data orchestration platform management engine to analyze the set of attributes of the network communication environment, an artificial intelligence (AI) logic unit to perform processing with respect to the set of interpreted data, and processing, using the AI logic unit, the set of interpreted data.

Aspects of the disclosure relate to identifying, by comparing the set of attributes of the set of interpreted data with a set of machine learning usability criteria in response to generating the set of interpreted data, a first subset of the set of interpreted data for machine learning, and routing, to a machine learning engine, the first subset of the set of interpreted data.

Aspects of the disclosure relate to deriving, by the machine learning engine using a machine learning technique configured to analyze a subset of the set of attributes for the first subset of the set of interpreted data with respect to a set of AI logic units, a first processing rule indicating a first AI logic unit of the set of AI logic units to process the first subset of the set of interpreted data, and constructing, using the first processing rule, a machine learning model configured to manage AI logic unit selection for processing of the set of interpreted data.

Aspects of the disclosure relate to utilizing, to determine the AI logic unit to perform processing with respect to the set of interpreted data, the machine learning model, and utilizing, by the data interpretation dictionary to analyze the set of raw data, a set of information source profiles for the set of information sources.

In aspects of the disclosure, the set of raw data includes both an information source identification element for a first information source of the set of information sources and a set of content data, and utilizing the set of information source profiles further comprises ascertaining, by comparing the information source identification element of the first information source with the set of information source profiles, a first information source profile corresponding to the first information source, and generating, in response to ascertaining the first information source profile corresponding to the first information source, the set of interpreted data using the first information source profile to analyze the set of raw data.

In aspects of the disclosure, the set of raw data includes both an information source identification element for a first information source of the set of information sources and a set of content data, and utilizing the set of information source profiles further comprises ascertaining, by comparing the information source identification element of the first information source with the set of information source profiles, absence of an information source profile corresponding to the first information source, and establishing, in response to ascertaining the absence of an information source profile corresponding to the first information source, a new information source profile associated with the information source identification element of the first information source using the machine learning engine.

In aspects of the disclosure, the set of content data includes one or more selected from the group consisting of a set of textual data, a set of image data, set of audio data, a set of video data, a measured value, a set of biometric data, a set of status information, or a set of location information.

In aspects of the disclosure, the set of attributes includes one or more selected from the group consisting of: a data type, a semantic factor, a time stamp, a unit of measurement, a confidence value, or a severity level.

In aspects of the disclosure, processing the set of interpreted data using the AI logic unit further comprises generating, using a predictive analysis technique configured to extract relationships between the set of interpreted data and a set of historical interpreted data, a set of candidate predicted contexts with respect to the network communication environment, and assigning, in response to generating the set of candidate predicted contexts, a set of confidence values for the set of candidate predicted contexts.

Aspects of the disclosure relate to selecting, by comparing the set of confidence values for the set of candidate predicted contexts with a threshold confidence value, a first candidate predicted context that achieves the threshold confidence value, and performing, using the data orchestration platform management engine with respect to the network communication environment, a management operation based on the first candidate predicted context.

Aspects of the disclosure relate to structuring, by the data orchestration platform management engine, a data processing pipeline including a set of AI logic units to perform processing operations with respect to the set of interpreted data.

Aspects of the disclosure relate to modifying, in a dynamic fashion by the data orchestration platform management engine using a machine learning model configured to manage AI logic unit selection for processing of the set of interpreted data, the data processing pipeline.

Aspects of the disclosure relate to storing, in an AI-based data storage system, the set of interpreted data in an output data type based on the set of attributes.

Aspects of the disclosure relate to executing, in a dynamic fashion to streamline data orchestration platform management, each of the ingesting, the generating, the determining, and the processing.

Aspects of the disclosure relate to executing, in an automated fashion without user intervention, each of the ingesting, the generating, the determining, and the processing.

Aspects of the disclosure relate to a system for data orchestration platform management in a network communication environment including a set of information sources, the system comprising a memory having a set of computer readable computer instructions, and a processor for executing the set of computer readable instructions, the set of computer readable instructions including ingesting, using the set of information sources, a set of raw data, generating, using a data interpretation dictionary configured to analyze the set of raw data, a set of interpreted data that indicates a set of attributes for the network communication environment, determining, using a data orchestration platform management engine to analyze the set of attributes for the network communication environment, an artificial intelligence (AI) logic unit to perform a processing operation with respect to the set of interpreted data, and processing, using the AI logic unit, the set of interpreted data.

Aspects of the disclosure relate to a computer program product for data orchestration platform management in a network communication environment including a set of information sources, the computer program product comprising a computer readable storage medium having program instructions embodied therewith, wherein the computer readable storage medium is not a transitory signal per se, the program instructions executable by a processor to cause the processor to perform a method comprising ingesting, using the set of information sources, a set of raw data, generating, using a data interpretation dictionary configured to analyze the set of raw data, a set of interpreted data that indicates a set of attributes for the network communication environment, determining, using a data orchestration platform management engine to analyze the set of attributes for the network communication environment, an artificial intelligence (AI) logic unit to perform a processing operation with respect to the set of interpreted data, and processing, using the AI logic unit, the set of interpreted data.

The computer program product according to aspects of the disclosure may be configured to identify, by comparing the set of attributes of the set of interpreted data with a set of machine learning usability criteria in response to generating the set of interpreted data, a first subset of the set of interpreted data for machine learning, and route, to a machine learning engine, the first subset of the set of interpreted data.

In the computer program product according to aspects of the disclosure, the program instructions may be stored in a computer readable storage medium in a data processing system, and the program instructions may be downloaded over a network from a remote data processing system In the computer program product according to aspects of the disclosure, the program instructions are stored in a computer readable storage medium in a server data processing system, and the program instructions are downloaded over a network to a remote data processing system for use in a computer readable storage medium with the remote data processing system.

According to the present disclosure, interpreting raw data ingested from a set of data sources and determining AI logic units to process the interpreted data in a dynamic fashion without user intervention may promote flexibility of the data orchestration platform, and eliminate the need for manual device configuration.

BRIEF DESCRIPTION OF DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DESCRIPTION OF EMBODIMENT(S)

Figure 1:
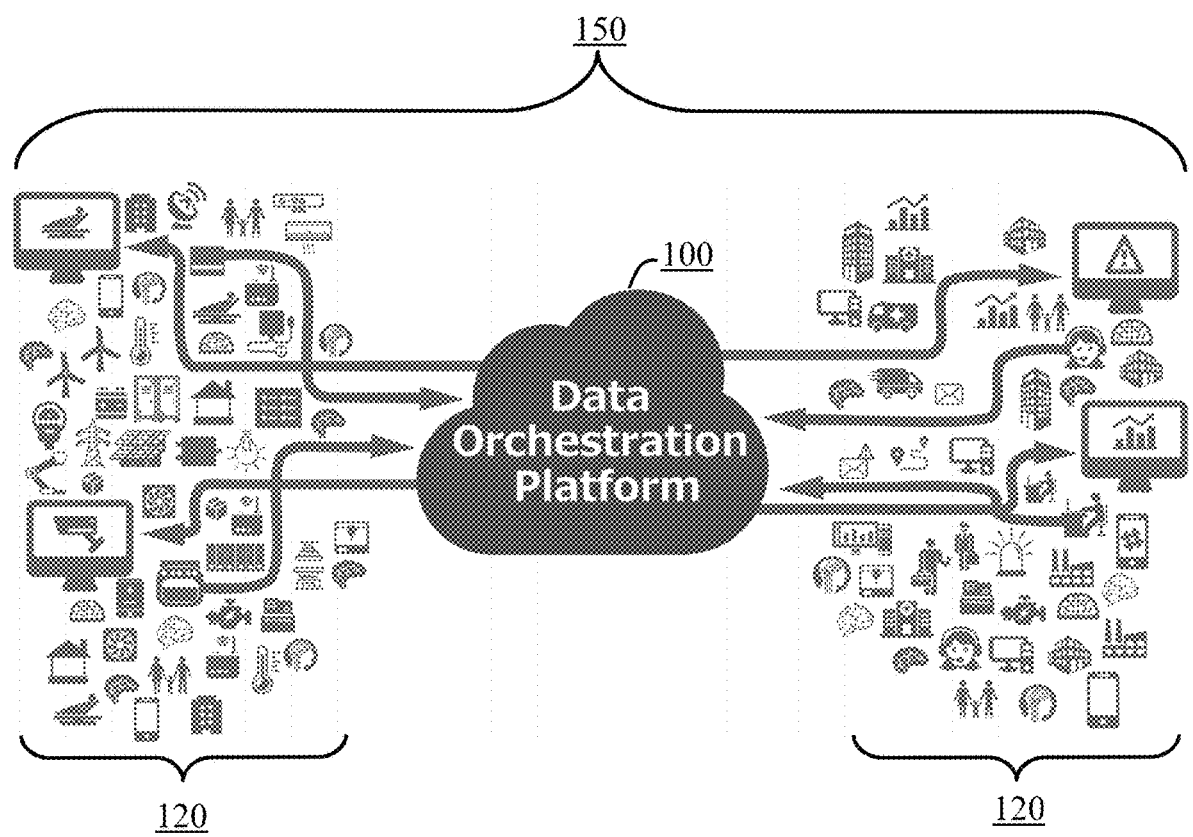
FIG. 1 is a conceptual diagram of a network communication environment including a data orchestration platform, according to embodiments.

Hereinafter, embodiments of the present invention will be described with reference to the Figures. It should be noted that the embodiments described herein are not intended to limit the invention according to the claims, and it is to be understood that each of the elements and combinations thereof described with respect to the embodiments are not strictly necessary to implement the aspects of the present invention.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein, Thus, the various aspects of the disclosure may be embodied in a number of different forms, all of which have been contemplated to be within the scope of the claimed subject matter.

As used herein, the term information source may be used to refer to any object, hardware component, software element, device, sensor, or human user from which data or information can be communicated. In embodiments, the set of information sources may include a set of data orchestration devices. Herein, a data orchestration device may refer to any object (e.g., an appliance, a sensor, etc.) that has an addressable interface (e.g., an Internet protocol (IP) address, a Bluetooth (registered trademark) identifier (ii)), a near-field communication (NFC ID), etc.) and can transmit information to one or more other devices over a wired or wireless connection. A data orchestration device may have a passive communication interface, such as a quick response (QR) code, a radio-frequency identification (RPM) tag, an NIT tag, or the like, or an active communication interface, such as a modem, a transceiver, a transmitter-receiver, or the like. For example, data orchestration devices may include, but are not limited to, computers, medical devices, biometric sensors, traffic lights, solar panels, factory machines, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the network communication environment. Data orchestration devices may also include cell phones, desktop computers, laptop computers, tablet computers, personal digital assistants (PDAs), etc. Accordingly the network communication environment may be comprised of a combination of "legacy" Internet-accessible devices (e.g., laptop or desktop computers, cell phones, etc.) in addition to devices that do not typically have Internet-connectivity (e.g., dishwashers, etc.).

Turning now to the Figures, FIG. 1 is a conceptual diagram of a network communication environment 150 including a data orchestration platform 100, according to embodiments. The network communication environment 150 may include a data orchestration platform 100 and an information source group 120.

The network communication environment 150 may be a network that facilitates data acquisition, communication, and connection between sensors, devices buildings, automobiles, organisms, software applications, and other entities that utilize the data orchestration platform. For example, as illustrated in FIG. 1, the network communication environment 150 may include a group of information sources 120 having a plurality of information sources. For example, the information source group 120 may refer to a collection of information sources such as devices, organisms, locations, software, or the like where data or information is generated in a network communication environment. As an example, as illustrated in FIG. 1, the information source group 120 may include factory production management systems, sensors for monitoring traffic flow rates, social networking service (SNS) platforms, external artificial intelligence (AI) databases, sensors for monitoring human biometric data, or various other equipment or systems. The data orchestration platform 100 may be realized by software or hardware that automatically and dynamically monitors, controls, and manages devices, computer systems, middleware, services, and other elements of the network communication environment 150. Here, the data orchestration platform 100 can implement the aspects of the present disclosure using methods such as IoT (Internet of Things) device management, AI data processing, machine learning, big data processing, and the like. As a specific example, the data orchestration platform 100 may be applied to fields including environmental monitoring, infrastructure management, manufacturing/factor management, media, energy management, medical/health care, biometrics, smart buildings/homes, transportation, urban development, or consumer applications.

Figure 2:
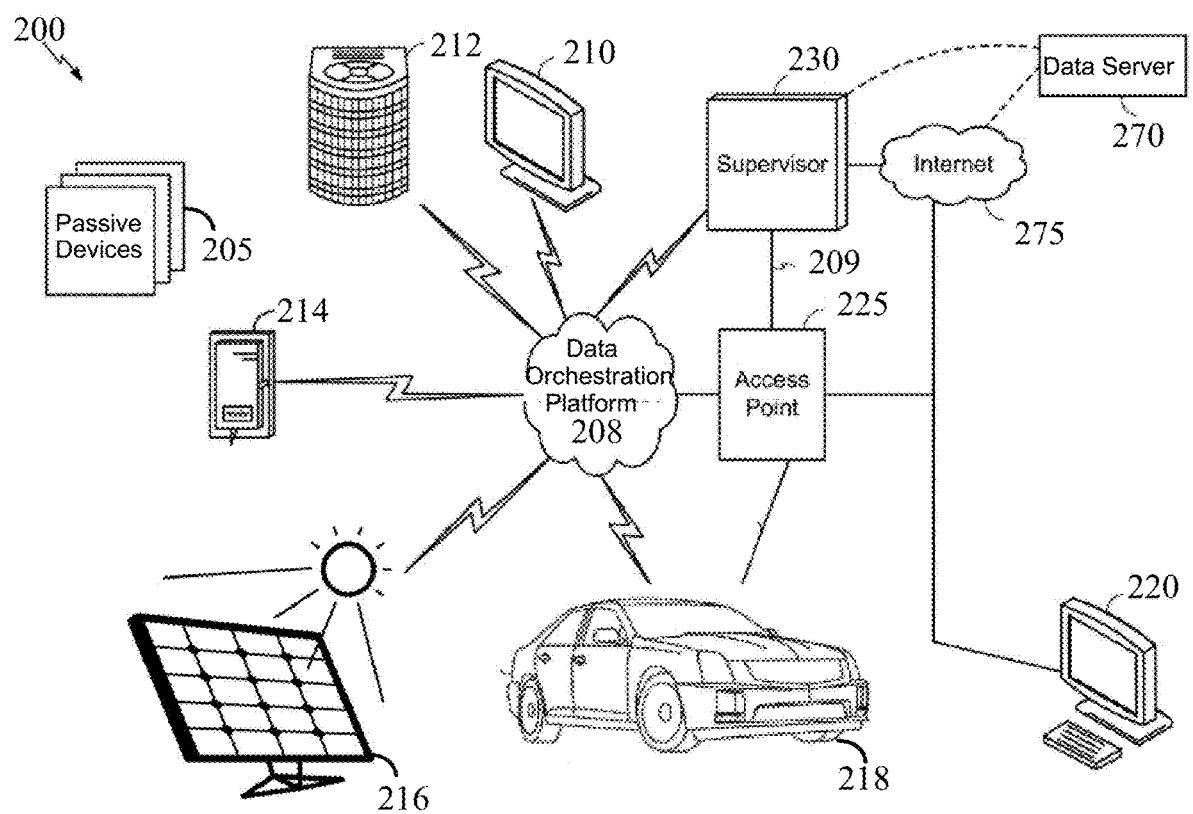
FIG. 2 depicts a high-level block diagram of a system architecture of a network communication environment, according to embodiments.

FIG. 2 illustrates a high-level system architecture of a network communication environment 200 in accordance with aspects of the disclosure. The network communication environment 200 may include a plurality of data orchestration devices, which include a television 210, an outdoor air conditioning unit 212, a thermostat 214, a solar panel 216, and a vehicle 218.

Referring to FIG. 2, data orchestration devices 210-218 are configured to communicate with an access network (e.g., an access point 225) over a physical communications interface or layer, shown in FIG. 2 as data orchestration platform 208 and a direct wired connection 209. The data orchestration platform 208 can comply with a wireless Internet protocol (IP), such as IEEE 802.11. Although FIG. 2 illustrates data orchestration devices 210-218 communicating over the data orchestration platform 208 or the direct wired connection 209, each data orchestration device may communicate over a wired or wireless connection, or both.

The Internet 275 includes a number of routing agents and processing agents (not shown in FIG. 2 for the sake of convenience). The Internet 275 is a global system of interconnected computers and computer networks that uses a standard Internet protocol suite (e.g., the Transmission Control Protocol (TCP) and IP) to communicate among disparate devices/networks, TCP/IP provides end-to-end connectivity specifying how data should be formatted, addressed, transmitted, routed and received at the destination.

In FIG. 2, a computer 220 is shown as connecting to the Internet 275 directly (e.g., over an. Ethernet (registered trademark) connection or Wi-Fi or 802.11-based network). The computer 220 may have a wired connection to the Internet 275, such as a direct connection to a modem or router, which, in an example, can correspond to the access point 225 itself (e.g., for a Wi-Fi router with both wired and wireless connectivity). The computer 220 may be a data orchestration device and/or include functionality to manage a data orchestration network/group, such as the network/ group of data orchestration devices 210-218. As an example, the computer 220 may be configured to provide a graphical user interface to a user for configuration or set-up of the data orchestration platform 208. Although illustrated as a desktop computer, computer 220 may be a laptop computer, a tablet computer, a PDA, a smart phone, or the like.

The access point 225 may be connected to the Internet 275 via, for example, an optical communication system, such as FiOS, a cable modem, a digital subscriber line (DSL) modem, or the like. The access point 225 may communicate with data orchestration devices 210-220 and the Internet 275 using the standard Internet protocols (e.g., TCP/IP).

Referring to FIG. 2, a data server 270 is shown as connected to the Internet 275. The data server 270 can be implemented as a plurality of structurally separate servers, or alternately may correspond to a single server. In an aspect, the data server 270 is optional (as indicated by the dotted line), and the group of data orchestration devices 210-220 may be a peer-to-peer (P2P) network. In such a case, the data orchestration devices 210-220 can communicate with each other directly through the data orchestration platform 208 and/or the direct wired connection 209. Alternatively, or additionally, some or all of data orchestration devices 210-220 may be configured with a communication interface independent of the data orchestration platform 208 and direct wired connection 209. For example, one or more of the data orchestration devices 210-220 may have Bluetooth or NFC interfaces for communicating directly with each other or other Bluetooth or NFC-enabled devices.

Referring to FIG. 2, the wireless communications system 200 may include a supervisor device 230, which may alternatively be referred to as an orchestration manager 230 or orchestration manager device 230. As such, where the following description uses the term "supervisor device" 230, those skilled in the art will appreciate that any references to a orchestration manager (IoT group, big data manager, etc.), group owner, or similar terminology may refer to the supervisor device 230 or another physical or logical component that provides the same or substantially similar functionality.

In one embodiment, the supervisor device 230 may generally observe, monitor, control, or otherwise manage the various other components in the network communication environment 200. For example, the supervisor device 230 can communicate with the data orchestration platform 208 to monitor or manage attributes, activities, or other states associated with the various data orchestration devices 210-220 in the network communication environment 200. The supervisor device 230 may have a wired or wireless connection to the Internet 275 and optionally to the data server 270 (shown as a dotted line). The supervisor device 230 may obtain information from the Internet 275 and/or the data server 270 that can be used to further monitor or manage attributes, activities, or other states associated with the various data orchestration devices 210-220. The supervisor device 230 may be a standalone device or one of data orchestration devices 210-220, such as the computer 220. The supervisor device 230 may be a physical device or a software application running on a physical device. The supervisor device 230 may include a user interface that can output information relating to the monitored attributes, activities, or other states associated with the data orchestration devices 210-220 and receive input information to control or otherwise manage the attributes, activities, or other states associated therewith. Accordingly, the supervisor device 230 may generally include various components and support various wired and wireless communication interfaces to observe, monitor, control, or otherwise manage the various components in the network communication environment 200.

The network communication environment 200 shown in FIG. 2 may include one or more passive data orchestration devices 205 (in contrast to the active data orchestration devices 210-220) that can be coupled to or otherwise made part of the network communication environment 200. In general, the passive data orchestration devices 205 may include barcoded devices, Bluetooth devices, radio frequency (RF) devices, RED tagged devices, infrared GR) devices, NFC tagged devices, or any other suitable device that can provide its identifier and attributes to another device when queried over a short range interface. Active data orchestration devices may detect, store, communicate, act on, and/or the like, changes in attributes of passive data orchestration devices.

For example, passive data orchestration devices 205 may include an inventory management system and an inventory item that each have an RFID tag or barcode. The inventory management system and the inventory item 216 may each have an appropriate scanner or reader that can read the RFID tag or barcode to detect when the inventory item of the passive data orchestration devices 205 have been added or removed to the inventory management system. In response to the inventory management system detecting the removal of the inventory item, the supervisor device 230 may receive one or more signals that relate to the activities detected by the inventory management system and the inventory item 216. The supervisor device 230 may then infer that a transaction has taken place (new inventory shipment arrival, purchase) with respect to the inventory item.

Although the foregoing describes the passive data orchestration devices 205 as having some form of RFID tag or barcode communication interface, the passive data orchestration devices 205 may include one or more devices or other physical objects that do not have such communication capabilities. For example, certain data orchestration devices may have appropriate scanner or reader mechanisms that can detect shapes, sizes, colors, and/or other observable features associated with the passive data orchestration devices 205 to identify the passive data orchestration devices 205. In this manner, any suitable physical object may communicate its identity and attributes and become part of the wireless communication system 200 and be observed, monitored, controlled, or otherwise managed with the supervisor device 230. Further, passive data orchestration devices 205 may be coupled to or otherwise made part of the wireless communications system 200 in FIG. 2 and observed, monitored, controlled, or otherwise managed in a substantially similar manner.

Figure 3:
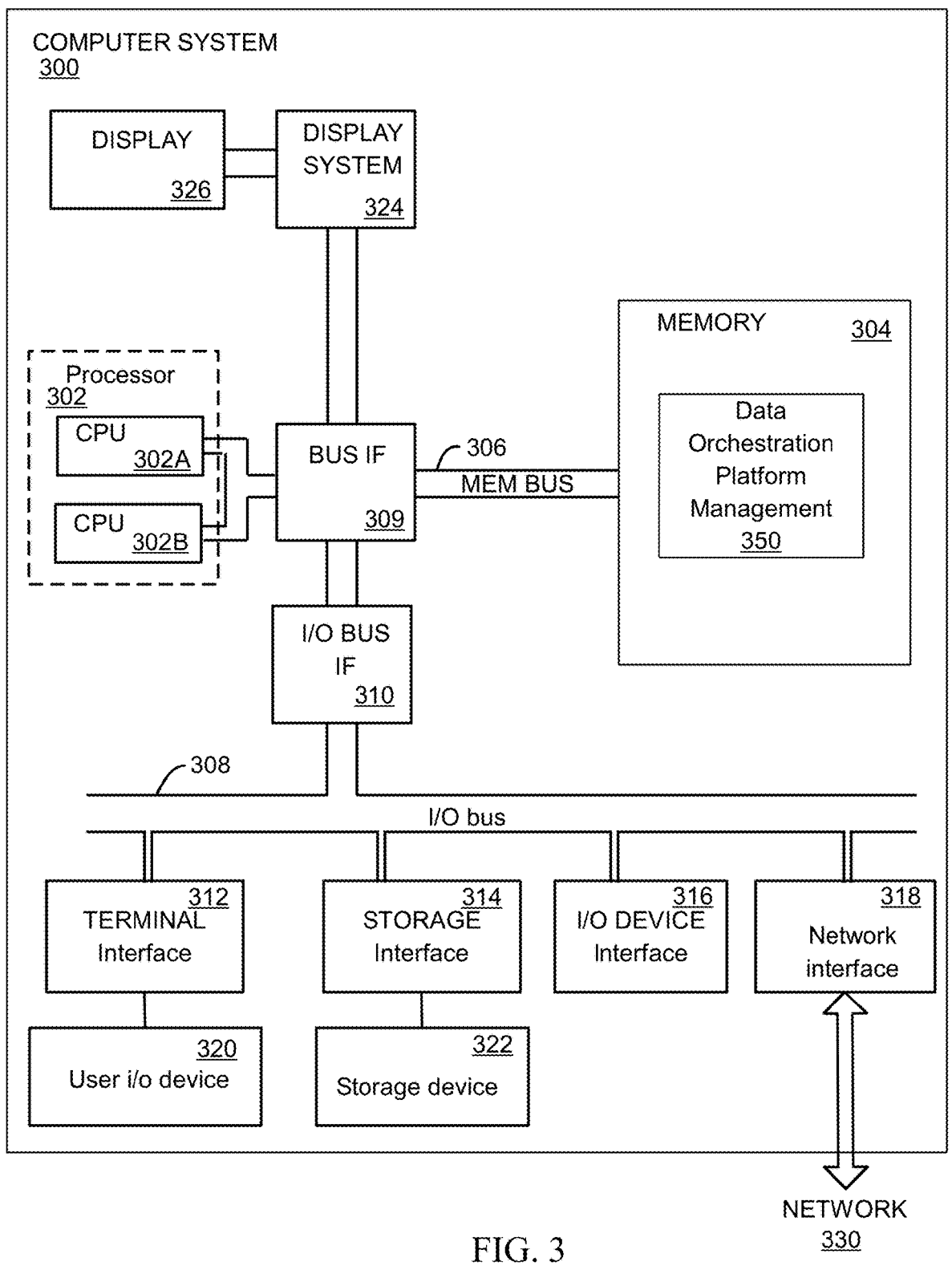
FIG. 3 is a block diagram of a computer system for implementing embodiments of the present disclosure, according to embodiments.

FIG. 3 depicts a high-level block diagram of a computer system 300 for implementing various embodiments of the present disclosure, according to embodiments. The mechanisms and apparatus of the various embodiments disclosed herein apply equally to any appropriate computing system. The major components of the computer system 300 include one or more processors 302, a memory 304, a terminal interface 312, a storage interface 314, an I/O (Input/Output) device interface 316, and a network interface 318, all of which are communicatively coupled, directly or indirectly, for inter-component communication via a memory bus 306, an I/O bus 308, bus interface unit 309, and an I/O bus interface unit 310.

The computer system 300 may contain one or more general-purpose programmable central processing units (CPUs) 302A and 302B, herein generically referred to as the processor 302. In embodiments, the computer system 300 may contain multiple processors; however, in certain embodiments, the computer system 300 may alternatively be a single CPU system. Each processor 302 executes instructions stored in the memory 304 and may include one or more levels of on-board cache.

In embodiments, the memory 304 may include a random-access semiconductor memory, storage device, or storage medium (either volatile or non-volatile) for storing or encoding data and programs. In certain embodiments, the memory 304 represents the entire virtual memory of the computer system 300, and may also include the virtual memory of other computer systems coupled to the computer system 300 or connected via a network. The memory 304 can be conceptually viewed as a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 304 may store all or a portion of the various programs, modules and data structures for processing data transfers as discussed herein. For instance, the memory 304 can store a data orchestration platform management application 350. In embodiments, the data orchestration platform management application 350 may include instructions or statements that execute on the processor 302 or instructions or statements that are interpreted by instructions or statements that execute on the processor 302 to carry out the functions as further described below. In certain embodiments, the data orchestration platform management application 350 is implemented in hardware via semiconductor devices, chips, logical gates, circuits, circuit cards, and/or other physical hardware devices in lieu of, or in addition to, a processor-based system. In embodiments, the data orchestration platform management application 350 may include data in addition to instructions or statements.

The computer system 300 may include a bus interface unit 309 to handle communications among the processor 302, the memory 304, a display system 324, and the I/O bus interface unit 310. The I/O bus interface unit 310 may be coupled with the I/O bus 308 for transferring data to and from the various I/O units. The I/O bus interface unit 310 communicates with multiple I/O interface units 312, 314, 316, and 318, which are also known as I/O processors (IOPs) or I/O adapters (IOAs), through the I/O bus 308. The display system 324 may include a display controller, a display memory, or both. The display controller may provide video, audio, or both types of data to a display device 326. The display memory may be a dedicated memory for buffering video data. The display system 324 may be coupled with a display device 326, such as a standalone display screen, computer monitor, television, or a tablet or handheld device display. In one embodiment, the display device 326 may include one or more speakers for rendering audio. Alternatively, one or more speakers for rendering audio may be coupled with an I/O interface unit. In alternate embodiments, one or more of the functions provided by the display system 324 may be on board an integrated circuit that also includes the processor 302. In addition, one or more of the functions provided by the bus interface unit 309 may be on board an integrated circuit that also includes the processor 302.

The I/O interface units support communication with a variety of storage and I/O devices. For example, the terminal interface unit 312 supports the attachment of one or more user I/O devices 320, which may include user output devices (such as a video display device, speaker, and/or television set) and user input devices (such as a keyboard, mouse, keypad, touchpad, trackball, buttons, light pen, or other pointing device). A user may manipulate the user input devices using a user interface in order to provide input data and commands to the user I/O device 320 and the computer system 300, and may receive output data via the user output devices. For example, a user interface may be presented via the user I/O device 320, such as displayed on a display device, played via a speaker, or printed via a printer.

The storage interface 314 supports the attachment of one or more disk drives or direct access storage devices 322 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 322 may be implemented via any type of secondary storage device. The contents of the memory 304, or any portion thereof, may be stored to and retrieved from the storage device 322 as needed. The I/O device interface 316 provides an interface to any of various other I/O devices or devices of other types, such as printers or fax machines. The network interface 318 provides one or more communication paths from the computer system 300 to other digital devices and computer systems; these communication paths may include, for example, one or more networks 330.

Although the computer system 300 shown in FIG. 3 illustrates a particular bus structure providing a direct communication path among the processors 302, the memory 304, the bus interface 309, the display system 324, and the I/O bus interface unit 310, in alternative embodiments the computer system 300 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 310 and the I/O bus 308 are shown as single respective units, the computer system 300 may, in fact, contain multiple I/O bus interface units 310 and/or multiple I/O buses 308. While multiple I/O interface units are shown, which separate the I/O bus 308 from various communications paths running to the various I/O devices, in other embodiments, some or all of the I/O devices are connected directly to one or more system I/O buses.

In various embodiments, the computer system 300 is a multi-user mainframe computer system, a single-user system, or a server computer or similar device that has little or no direct user interface, but receives requests from other computer systems (clients). In other embodiments, the computer system 300 may be implemented as a desktop computer, portable computer, laptop or notebook computer, tablet computer, pocket computer, telephone, smart phone, or any other suitable type of electronic device.

Figure 4:
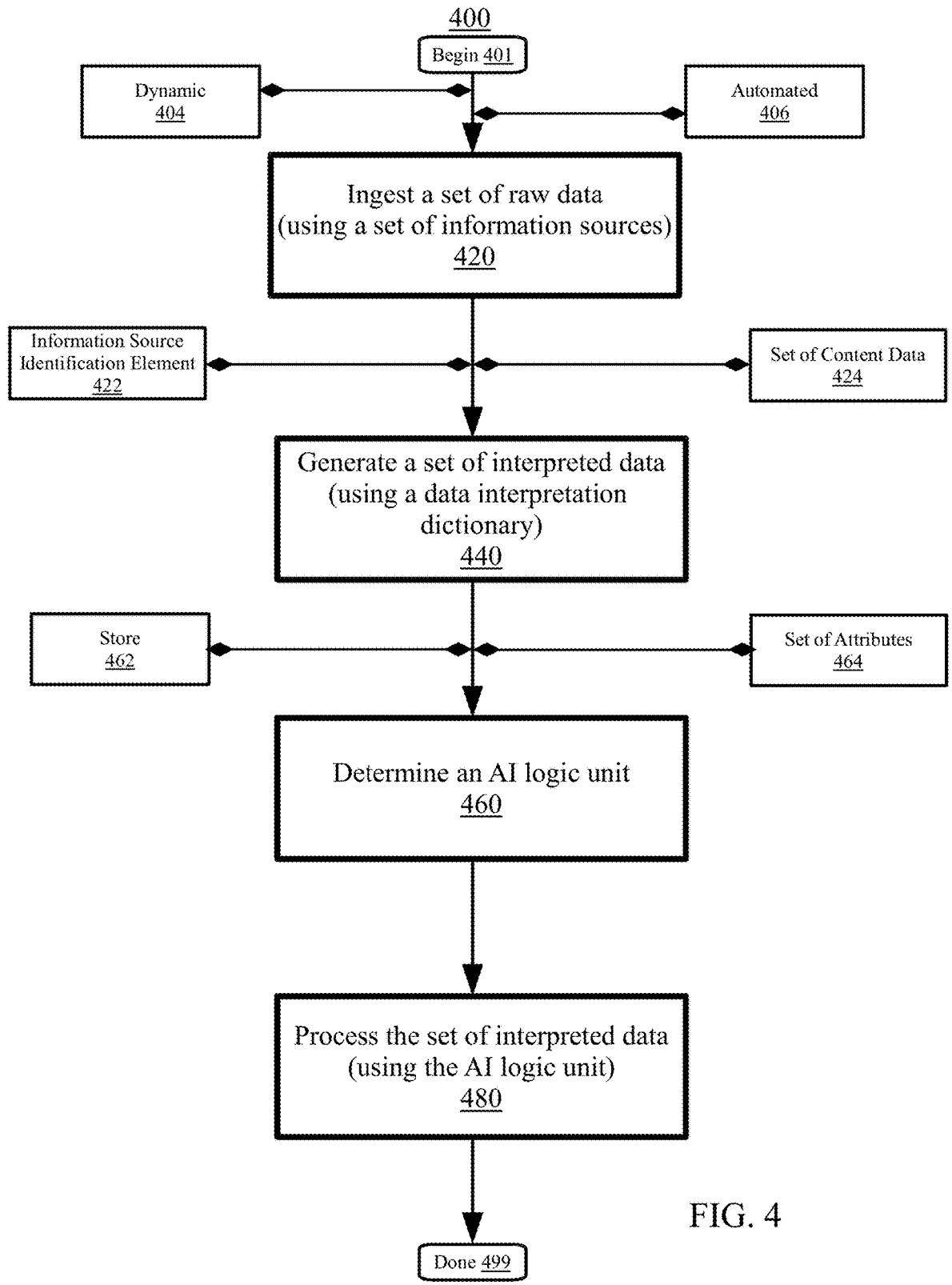
FIG. 4 is a flowchart illustrating a method of data orchestration platform management, according to embodiments.

FIG. 4 is a flowchart illustrating a method 400 of data orchestration platform management, according to embodiments. Aspects of the method 400 relate to determining an artificial intelligence (AI) logic unit to perform a processing operation on a set of data collected from a network communication environment. The network communication environment may include a group or system of interconnected sensors, devices, vehicles, buildings, people, software applications, and other objects to facilitate data collection, communication, and connectivity using a data orchestration platform. The data orchestration platform may include a layer of software and hardware components configured to facilitate automated and dynamic arrangement, coordination, and management of computer systems, middleware, and services. As described herein, the data orchestration platform may utilize one or more of a variety of techniques including Internet-of-Things (IoT) device management, AI-based data processing, machine learning engines, and big data processing tools to implement the aspects described herein. As examples, the data orchestration platform may include applications such as environment monitoring, infrastructure management, manufacturing/factory management, media, energy management, medical/healthcare, biometrics, building/home automation, transportation, metropolitan scale developments, consumer applications, and the like.

Aspects of the disclosure relate to the recognition that, in some situations, the context, objective, significance, and other factors (e.g., the meaning of the data) for data acquired from a network communication environment may differ based on the information source from which it was collected, and as such, it may be desirable to perform different processing operations on the data based on the nature and attributes of the information source. Accordingly, aspects of the disclosure relate to generating a set of interpreted data using a data interpretation dictionary, and determining an AI logic unit to perform a processing operation on the set of interpreted data in an automated fashion. Altogether, determining AI logic units based on the information source from which data was collected may be associated with benefits such as data utility, data reliability, and data orchestration platform performance and efficiency. The method 400 may begin at block 401.

In embodiments, the ingesting, the generating, the determining, the processing, and the other steps described herein may each be executed in a dynamic fashion at block 404. The steps described herein may be executed in a dynamic fashion to streamline data orchestration platform management. For instance, the ingesting, the generating, the determining, the processing, and the other steps described herein may occur in real-time, ongoing, or on-the-fly. As an example, one or more steps described herein may be performed on-the-fly (e.g., an AI logic unit to perform a processing operation with respect to a set of interpreted data may be determined in real-time based on the characteristics of the data) in order to streamline (e.g., facilitate, promote, enhance) data orchestration platform management. Other methods of performing the steps described herein are also possible.

In embodiments, ingesting, the generating, the determining, the processing, and the other steps described herein may each be executed in an automated fashion at block 406. The steps described herein may be executed in an automated fashion without user intervention. In embodiments, the ingesting, the generating, the determining, the processing, and the other steps described herein may be carried out by an internal data orchestration platform management module maintained in a persistent storage device of a local computing device (e.g., network node). In embodiments, the ingesting, the generating, the determining, the processing, and the other steps described herein may be carried out by an external data orchestration platform management module hosted by a remote computing device or server (e.g., server accessible via a subscription, usage-based, or other service model). In this way, aspects of data orchestration platform management may be performed using automated computing machinery without manual action. Other methods of performing the steps described herein are also possible.

At block 420, a set of raw data may be ingested. The set of raw data may be ingested from a set of information sources. Generally, ingesting can include detecting, analyzing, sensing, receiving, collecting, gathering, transforming, importing, or otherwise capturing the set of raw data from the set of information sources. The set of information sources may include devices, people, locations, software, or other points from which data related to the network communication environment is produced. As examples, the set of information sources may include a manufacturing execution system (MES) deployed in a factory environment, a programmable logic controller (PLC) of a server, a human user input, a heart monitor, a camera, a solar panel, a vehicle, or the like. In embodiments, ingesting may include using a plurality of data orchestration devices (e.g., cameras, microphones, thermal cameras, motion sensors, thermometers, photodetectors, barometers, hydrometers, capacitance sensors, accelerometers, and other sensors) to aggregate (e.g., collect, capture) the set of raw data from the network communication environment (e.g., home environment, health care facility, factory, office building, road/highway), and transmit it to the data orchestration platform.

As described herein, the set of information sources may be used to ingest a set of raw data. The set of raw data may include a collection of structured or unstructured information collected by information sources of the network communication environment. For instance, the set of raw data may include textual data (e.g., reports), image data (e.g., captured photographs), audio data (e.g., sound recordings), video data (e.g., video recordings), biometric data (e.g., heart rate, mental state) or other media to indicate the status (e.g., temperature measurements, resource usage diagnostics), location (e.g., absolute or relative indication of the geographic/spatial location of an entity), automated processes (e.g., tasks, operations, procedures that are queued for automated performance), actionable items (e.g., parameter states or conditions that trigger manual or automated events) or other aspects of the network communication environment. The set of raw data may include passive data (e.g., data from information sources that collect data only when instructed), active data (e.g., sensors/information sources configured to continuously collect and transmit data), or dynamic data (e.g., bidirectional communication between sensor devices and software applications). For instance, the set of raw data may include dynamic measurements of the density of particulates in an air volume of a specified area.

In embodiments, ingesting the set of raw data may include configuring the set of data orchestration devices to push (e.g., automatically relay) the set of raw data to the data orchestration platform in a continuous or ongoing fashion. In embodiments, ingesting the set of raw data may include configuring the data orchestration platform to dynamically pull (e.g., request) the set of raw data from the set of data orchestration devices. As an example, ingesting the set of raw data may include using a thermometer to collect temperature data, a barometer to collect air pressure data, and a humidity sensor to collect humidity data for a battery manufacturing facility, and relaying the data in real-time to the data orchestration platform to dynamically monitor for irregularities in battery production (e.g., changes to temperature, humidity, or pressure that may negatively impact battery yield). Other methods of ingesting the set of raw data using the set of information sources are also possible.

In embodiments, the set of raw data may include an information source identification element for a first information source of the set of information sources at block 422. Generally, the information source identification element may include a tag, label, name, code, series of characters, or other attribute that uniquely identifies a particular information source among the set of information sources. As an example, consider a set of information sources including several hundred sensors for measuring different properties of a environment (e.g., humidity, temperature, pressure, luminescence). A unique identification element in the form of a 12-character string may be assigned to each individual sensor of the set of information sources. For instance, a particular sensor of the set of information sources may include an information source identification element of "N3A54MI0554R" that is unique among the set of information sources. As described herein, the information source identification element may be included in the set of raw data. For instance, when data is ingested from an information source, the information source may be configured to bundle a set of metadata including its own information source identification element (e.g., such that the raw data can be traced back to the information source from which it was ingested). Other types of information source identification elements are also possible.

In embodiments, the set of raw data may include a set of content data at block 424. Generally, the set of content data may include a collection of information related to one or more aspects of the network communication environment. In embodiments, the set of content data may include one or more of a set of textual data (e.g., textual description of an observation), a set of image data (e.g., captured photograph, generated image), a set of video data (e.g., visual depiction of an event), a measured value (e.g., numeric representation of an absolute or relative quantity), a set of biometric data (e.g., measurements and calculations of human characteristics), a set of status information (e.g., state or condition), or a set of location information (e.g., absolute or relative position of an object or person), or any combination thereof. For example, the set of content data may include an image of traffic congestion together with a measured value of the length of the congestion and the geographical coordinates of the location where the congestion is occurring. Other types of content data are also possible.

At block 440, a set of interpreted data that indicates a set of attributes of the network communication environment may be generated. The set of interpreted data may be generated using a data interpretation dictionary configured to analyze the set of raw data. Generally, generating can include formulating, creating, instantiating, producing, assembling, structuring, arranging, organizing, or otherwise establishing the set of interpreted data that indicates the set of attributes of the network communication environment. The set of interpreted data may include a set of structured information that defines, explains, describes, or otherwise contextualizes the set of raw data. For instance, the set of interpreted data may indicate a set of attributes of the network communication environment. The set of attributes may include properties, characteristics, qualities, or other factors that characterize the configuration, composition, function, or purpose of the network communication environment. For example, at block 464, the set of attributes may include a data type (e.g., temperature data, voltage data, biometric data, inventory data), a semantic factor (e.g., indication of the purpose or significance of the data; for example, a particular data set is being collected to monitor for anomalies in seismic activity), a time stamp (e.g., the data was recorded at a time of 16:34 on Apr. 6, 2017), a unit of measurement (e.g., volts, meters per second, degrees Celsius, beats per second), a confidence value (e.g., the data has a 79% likelihood of being accurate), a severity level (e.g., low severity, modern severity, high severity), or the like.

In embodiments, the set of interpreted data that indicates the set of attributes of the network communication environment may be generated using a data interpretation dictionary configured to analyze the set of raw data. The data interpretation dictionary may include a database, index, repository, or other lexical resource configured to decipher, define, translate, clarify, or otherwise extract meaning from the set of raw data. In embodiments, generating may include utilizing the data interpretation dictionary to identify one or more corresponding attributes that define, characterize, or contextualize a particular set of raw data based on the information source from which the set of raw data was ingested (e.g., using the information source identification element, as will be described later). The identified attributes may then be mapped to the corresponding set of raw data to compile a data package including both the original set of raw data as well as the identified attributes attached as metadata. As an example, consider a situation in which a set of raw data including a value of "7.6" is collected by a sensor in a zoo aquarium. The set of raw data may be analyzed using the data interpretation dictionary, and a set of interpreted data may be generated that indicates that the value of "7.6" indicates pH data for the water in the zoo aquarium. Accordingly, an attribute of "Measurement Unit-pH" may be attached as metadata to the set of raw data, and the set of raw data and the set of metadata may be bundled together to generate the set of interpreted data. Other methods of generating the set of interpreted data are also possible.

In embodiments, at block 462, the set of interpreted data may be stored in an AI-based data storage system. The set of interpreted data may be stored in the AI-based data storage system based on the set of attributes. Generally, storing can include saving, recording, collecting, aggregating, caching, or otherwise maintaining the set of interpreted data in the AI-based data storage system. The AI-based data storage system may include a database management system (DBMS), data repository, cloud storage, or other data maintenance method configured to use AI tools to facilitate recording, searching, and retrieving of stored data. In embodiments, storing the set of interpreted data may include using a machine learning technique to sort sets of interpreted data and group them according to their attributes (e.g., data type, semantic factor, time stamp, unit of measurement, confidence value, severity level). The sorted interpreted data may then be stored in the data storage system in association with the attributes to which they correspond. For example, sets of interpreted data associated with the same semantic factor (e.g., seismic activity anomaly detection) may be stored in the same partition of a database in association with a tag indicating the semantic factor to facilitate data retrieval (e.g., all data associated with a semantic factor of "seismic activity anomaly detection" may be easily searched for and returned). Other methods of storing the set of interpreted data in the AI-based data storage system are also possible.

At block 460, an AI logic unit to perform a processing operation with respect to the set of interpreted data may be determined. The AI logic unit may be determined using a data orchestration platform management engine configured to analyze the set of attributes of the network communication environment. As described herein, the data orchestration platform management engine may include a hardware component or software module configured to monitor, control, analyze, evaluate, or otherwise manage the hardware and software elements of the data orchestration platform. Generally, determining can include resolving, electing, detecting, selecting, identifying, or otherwise ascertaining the AI logic unit to perform the processing operation with respect to the set of interpreted data. Aspects of the disclosure relate to the recognition that, in some situations, it may be desirable to select an appropriate AI logic unit to process a set of interpreted data based on the attributes of the data. Herein, an AI logic unit may refer to a module, application, routine, algorithm, script, or other AI-based technique configured to examine, discover, interpret, transform, or process data to derive meaning or perform tasks. As examples, the AI logic unit may include a natural language processing technique, image analysis technique, predictive analytics, statistical analysis, prescriptive analytics, market modeling, web analytics, security analytics, risk analytics, software analytics, and the like.

In embodiments, determining the AI logic unit may include using the data orchestration platform management engine to compare the set of attributes associated with a particular set of interpreted data to a collection of profiles characterizing a variety of available AI logic units, assigning a suitability score to a plurality of the AI logic units (e.g., to indicate the fitness/appropriateness of that AI logic unit to process the data), and determining one or more AI logic units that achieve a suitability score threshold to perform the processing operation with respect to the set of interpreted data. For example, consider that a set of interpreted data is associated with a set of attributes of "data format: JPEG" and "data type: security camera image." The data orchestration platform management engine may compare the set of interpreted data with a collection of available AI logic units of a natural language processing technique, a statistical analysis technique, an image analysis technique, and a sentiment analysis technique. In embodiments, the data orchestration platform management engine may assign a suitability score of 13 to the statistical analysis technique (e.g., as the set of interpreted data does not include statistics, statistical analysis may not be suitable), a suitability score of 89 for the image analysis technique (e.g., as the data is an image, image analysis is highly relevant), and a suitability score of "55" to the sentiment analysis technique (e.g., while potentially applicable, the data type of security image indicates a lower relevance for sentiment analysis). Subsequently, the data orchestration platform management engine may select an AI logic unit that achieves a suitability score threshold (e.g., the AI logic unit having the highest score, or an AI logic unit having a suitability score of 80 or more, for instance) as the AI logic unit to process the set of interpreted data. Other methods of determining the AI logic unit to process the set of interpreted data are also possible.

At block 480, the set of interpreted data may be processed using the AI logic unit. Generally, processing can include analyzing, converting, investigating, evaluating, modifying, or otherwise performing an operation on the set of interpreted data using the AI logic unit. In embodiments, processing may include using the determined AI logic unit to add or subtract attributes to the set of interpreted data (e.g., add additional measurement values to a table), updating the value of existing attributes of the set of interpreted data (e.g., change an existing record in a table based on a new measurement), using the set of interpreted data as an input for another operation (e.g., using a time value to calculate a velocity), extract a conclusion or inference from the set of interpreted data (e.g., an anomalous voltage value has occurred), converting the set of interpreted data to another type or format (e.g., converting a Fahrenheit temperature value to a Celsius temperature value), or the like. In particular, processing may include executing a statistical analysis technique, a machine learning technique, a data optimization technique, a predictive analysis technique, or other suitable analytics operation. As an example, processing may include using a regression analysis technique to analyzing the statistical relationship between two sets of voltage measurements. Other methods of processing the set of interpreted data using the AI logic unit are also possible.

Consider the following example. A set of raw data including a character sequence of "0b10101" is ingested by a data orchestration device Device A having an information source identification element of "scvlt24," and transmitted to the data orchestration platform. As described herein, the set of raw data may be analyzed using the data interpretation dictionary to generate a set of interpreted data. In particular, for example, the data interpretation dictionary may use the data source identification element "scvlt24" to identify an information source profile for Device A. Based on the information source profile, the data interpretation dictionary may ascertain that Device A is a solar cell that measures a voltage value and outputs the measured voltage value in a binary format. Accordingly, the data interpretation dictionary may attach a set of metadata indicating a set of attributes of "data type-solar cell measurement," "data format-binary value," and "unit of measurement-volts" to the set of raw data to generate a set of interpreted data. In response to generation of the set of interpreted data, an AI logic unit may be determined to process the set of interpreted data. For instance, the set of interpreted data may be compared to a variety of candidate AI logic units (e.g., natural language processing units, image analysis units, predictive analytics units), and it may be determined that a statistical analysis unit configured to derive relationships between the measured voltage value and past voltage values (e.g., to identify anomalies) has a suitability score that achieves a suitability score threshold for the set of interpreted data. Accordingly, the set of interpreted data may be processed using the determined statistical analysis unit. Other methods of managing the set of interpreted data are also possible.

Method 400 concludes at block 499. As described herein, aspects of method 400 relate to data orchestration platform management. Aspects of method 400 may provide performance or efficiency benefits related to data orchestration platform management. As an example, automatically determining AI logic units to process specific sets of data ingested from a set of information sources may promote flexibility of the data orchestration platform, and eliminate the need for manual device configuration (e.g., network administrators need not manually select AI logic units for registration to particular information sources). Altogether, determining AI logic units based on the information source from which data was collected may be associated with benefits such as data utility, data reliability, and data orchestration platform performance and efficiency.

Figure 5:
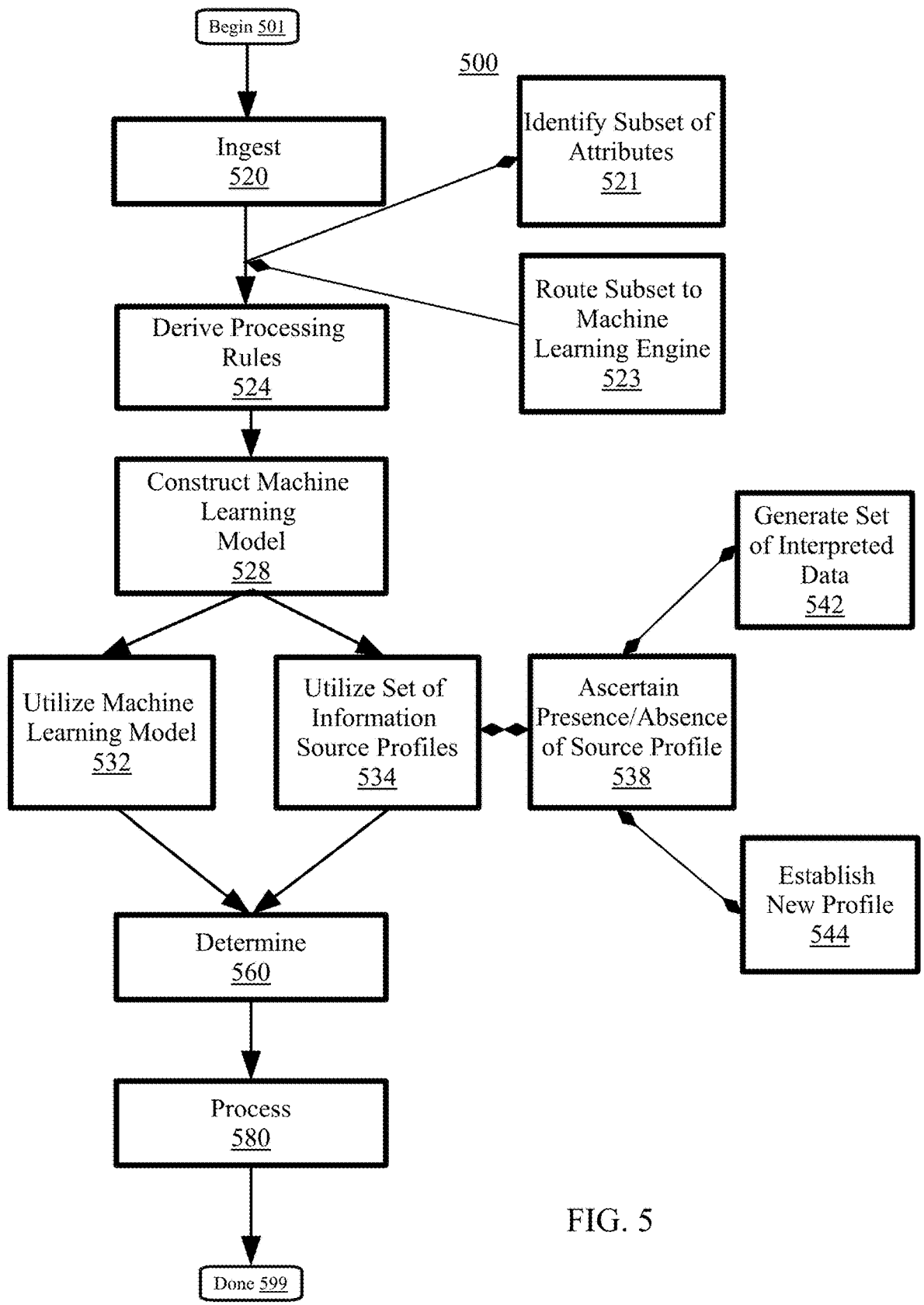
FIG. 5 is a flowchart illustrating a method of data orchestration platform management, according to embodiments.

FIG. 5 is a flowchart illustrating a method 500 of data orchestration platform management, according to embodiments. Aspects of method 500 relate to utilizing a machine learning model and a set of information source profiles to manage generation of the set of interpreted data. In embodiments, aspects of method 500 may be similar or the same as aspects of method 400, and aspects may be utilized interchangeably with one or more methodologies described herein. In embodiments, the method 500 may be performed subsequently to execution of the method 400. The method 500 may begin at block 501. At block 520, a set of raw data may be ingested using a set of information sources. At block 524, a set of processing rules may be derived. At block 528, a machine learning model may be constructed. At blocks 532 and 534, the machine learning model and a set of information source profiles may be used to analyze the set of raw data.

In embodiments, a first subset of the set of interpreted data may be identified for machine learning at block 521. The first subset of the set of interpreted data may be identified by comparing the set of attributes of the set of interpreted data with a set of machine learning usability criteria. Generally, identifying can include detecting, discovering, discovering, recognizing, distinguishing, or otherwise ascertaining the subset of the set of interpreted data for machine learning. In embodiments, the subset of interpreted data may include a portion of the set of interpreted data that is determined to be relevant, beneficial, helpful, effective, or otherwise useful for training a machine learning engine. As described herein, the subset of interpreted data may be identified using a set of machine learning usability criteria. The set of machine learning usability criteria may include a collection of parameters, characteristics, conditions, requirements, stipulations, or benchmarks to assess the degree of utility of the set of interpreted data for machine learning. As examples, the set of machine learning usability criteria may include factors such as whether data having a particular attribute has already been processed by the machine learning engine (e.g., data having new attributes may be relevant for training the machine learning technique), the type of information source from which the data was received (e.g., a photodetector, an accelerometer, an MES), contextual factors of the ingested data (e.g., the reason why the data is being collected), or the like. In embodiments, the set of machine learning usability criteria may be structured based on the nature of the machine learning engine (e.g., different types machine learning engines may have different standards/benchmarks for defining usability). As an example, consider that a particular machine learning engine is configured to recognize patterns that indicate the potential for weather phenomena (e.g., storms, rain, snow, hail). A set of interpreted data may be ingested that indicates humidity levels, soil nitrogen concentrations, and groundwater levels over a defined time period. Accordingly, the set of interpreted data may be compared to the set of machine learning usability criteria, and it may be determined that as humidity levels are relevant to weather phenomena prediction, the subset of the set of interpreted data that pertains to humidity levels may be identified as a subset of interpreted data that may be useful for machine learning. Other methods of identifying the subset of interpreted data for machine learning are also possible.

In embodiments, the subset of interpreted data may be routed to a machine learning engine at block 523. Generally, routing can include transmitting, sending, conveying, directing, relaying, or otherwise transferring the subset of interpreted data to the machine learning engine. As described herein, the machine learning engine may include a hardware component or software module configured to analyze, process, or otherwise manage the set of interpreted data to derive meaning, extract inferences, make deductions, form conclusions, and automatically learn based on the observation and evaluation of data. As examples, the machine learning engine may be configured to utilize rule-based learning techniques, deep-learning techniques, dimensionality reduction methods, ensemble learning techniques, instance-based algorithms, regression analysis, supervised learning techniques, Bayesian networks, artificial neural networks, decisions trees, cluster analysis, anomaly detection, reinforcement learning, or a combination of these and other techniques. In embodiments, the machine learning engine may be deployed internally within the data orchestration platform. In certain embodiments, the machine learning engine may be deployed externally to the data orchestration platform, and be communicatively connected to the data orchestration platform. In embodiments, routing the subset of interpreted data may include compiling the subset of interpreted data into a training corpus, and exporting it to the machine learning engine to facilitate generation of a machine learning model. Other methods of routing the subset of interpreted data to the machine learning engine are also possible.

A first processing rule that indicates a first AI logic unit of the set of AI logic units to process the first subset of the set of interpreted data may be derived at block 524. The first processing rule may be derived by a machine learning technique configured to analyze a subset of the set of attributes for the first subset of the set of interpreted data with respect to a set of AI logic units. Generally, deriving can include calculating, extracting, inferring, computing, identifying, deducing, formulating, or otherwise ascertaining the first processing rule that indicates a first AI logic unit of the set of AI logic units to process the first subset of the set of interpreted data. The first processing rule may include a principle, guideline, axiom, stipulation, or other regulation that establishes a relationship between one or more attributes of the set of interpreted data and one or more AI logic units (or types of logic units). Particularly, the first processing rule may be structured in the form of an {IF: THEN} expression (e.g., IF a subset of interpreted data is associated with an attribute of "Data Format: Textual Data, THEN process it using an AI logic unit of a natural language processing technique"). In embodiments, deriving the first processing rule may include extracting a relationship between a subset of the set of attributes associated with the subset of interpreted data and one or more characteristics of an AI logic unit. As an example, in response to receiving a subset of interpreted data associated with a subset of attributes of "data format-CSV file," "data type-data traffic statistics," and "semantic factor-intrusion detection monitoring," the machine learning technique (e.g., classifier system, association rule learning algorithm, artificial immune system) may analyze the subset of attributes with respect to the characteristics (e.g., features, properties, qualities) of a pool of available AI logic units, and derive a first rule that defines that sets of interpreted data having either an attribute of "data type-data traffic statistics," or an attribute of "semantic factor-intrusion detection monitoring" be processed using an AI logic unit configured to perform analysis of variance analysis (ANOVA). Other methods of deriving the first rule that indicates a first AI logic unit of the set of AI logic units to process the first subset of the set of interpreted data are also possible.

In embodiments, a machine learning model may be constructed using the first processing rule at block 528. The machine learning model may be configured to manage AI logic unit selection. Generally, constructing can include building, creating, formulating, organizing, producing, composing, structuring, or otherwise establishing the machine learning model. The machine learning model may include a collection of accumulated rules related to AI logic unit selection. The machine learning model may be configured to continuously add, subtract, revise, and update the rules contained therein as new data is ingested and processed by the data orchestration management platform. The machine learning model may be configured to be accessible by the data orchestration platform management engine to be applied to AI logic unit determination. In embodiments, constructing the machine learning model may include compiling the first processing rule in association with a plurality of other rules in a probabilistic graphical format. For instance, each rule may be expressed in the probabilistic graphical format as a conditional dependence relationship between a particular AI logic unit and one or more attributes of the subset of interpreted data. As an example, with reference to the previous example, a node representing an ANOVA logic unit may be linked to nodes representing an attribute of "data type-data traffic statistics," and an attribute of "semantic factor-intrusion detection monitoring." Accordingly, when a set of interpreted data is generated in the data orchestration platform, the machine learning model may be used to determine an appropriate AI logic unit for processing of the set of interpreted data. Other methods of constructing the machine learning model are also possible.

In embodiments, the machine learning model may be utilized to determine the AI logic unit to perform processing with respect to the set of interpreted data at block 532. Generally, utilizing can include applying, employing, leveraging, or otherwise making use of the machine learning model to determine the AI logic unit. As described herein, aspects of the disclosure relate to dynamically determining suitable AI logic units to process particular sets of data based on the attributes of the data. Accordingly, the machine learning model constructed using the processing rules derived by the machine learning engine may be leveraged to facilitate intelligent AI logic unit selection. In embodiments, utilizing the machine learning model may include comparing the set of attributes for a set of interpreted data with the dependency relationships established in the machine learning model, and ascertaining a particular AI logic unit to process the set of interpreted data based on the processing rules defined by the machine learning model. As an example, with reference to the previous example, in the event that a set of interpreted data associated with an attribute of "data type-data traffic statistics" is ingested by the data orchestration platform, the data orchestration platform management engine may apply the machine learning model to determine an ANOVA logic unit for processing the set of interpreted data (e.g., the first processing rule indicates that data having an attribute of "data type-data traffic statistics" should be processed by an ANOVA logic unit). Other methods of utilizing the machine learning model are also possible.

In embodiments, a set of information source profiles for the set of information sources may be utilized by the data interpretation dictionary to analyze the set of raw data at block 534. Generally, utilizing can include applying, employing, leveraging, or otherwise making use of the set of information source profiles to analyze the set of raw data. In embodiments, the set of information source profiles may include a collection of data or information that describes, defines, or characterizes the type, configuration, settings, and other properties of the set of information sources. For instance, the set of information source profiles may indicate the information source type (e.g., human user, MES, voltage sensor), manufacturer, model number, firmware version, data collection characteristics (e.g., what type of data is collected, rate of data collection, latency), data output format (e.g., binary, CSV file), or other aspects that characterize the information source. In embodiments, the information source profile for a particular information source may be linked to the information source identification element for that information source. As an example, an information source profile for a heart beat sensor may indicate that a sensor with an identification element of "bsensehbmon1384" was manufactured by Biosensor INC., has a model number of HS524AL#DQC, a firmware version of 1.62, is set to collect heart rate frequency measurements once every 3 seconds, and outputs measured data in a CSV format. In embodiments, utilizing the set of information source profiles may include configuring the data interpretation dictionary to reference the set of information source profiles in order to identify a set of attributes for the set of interpreted data based on the characteristics of the information source. For instance, the data interpretation dictionary may compare an information source identification element with the collection of information source profiles to identify an information source profile corresponding to a particular information source, and leverage the characteristics of the information source to analyze the set of raw data and generate the set of interpreted data.

In embodiments, the information source identification element of the first information source may be compared with the set of information source profiles to ascertain whether or not a first information source profile corresponding to the first information source is present at block 538. Generally, ascertaining can include computing, formulating, detecting, calculating, resolving, identifying, or otherwise determining whether or not a first information source profile corresponding to the first information source is present. As described herein, ascertaining may include comparing the information source identification element of the first information source with a collection of information source profiles to determine whether an information source profile linked with an information source identification element corresponding to the information source identification element of the first information source is present. In particular, comparing may include searching the collection of information source profiles for a profile associated with an information source identification element that achieves a similarity threshold (e.g., number of matching characters) with respect to the information source identification element of the first information source. In the event that an information source profile associated with an information source identification element that achieves the similarity threshold with respect to the information source identification element of the first information source is detected, the method may proceed to generate the set of interpreted data at block 542 (e.g., using the set of information source profiles). In the event that a an information source profile associated with an information source identification element that achieves the similarity threshold with respect to the information source identification element of the first information source is not detected, the method may proceed to establish a new information source profile at block 544 (e.g., corresponding to the information source identification element).

In embodiments, in response to ascertaining the first information source profile corresponding to the first information source, the set of interpreted data may be generated using the first information source profile at block 542. Generally, generating can include formulating, creating, instantiating, producing, assembling, structuring, arranging, organizing, or otherwise establishing the set of interpreted data using the first information source profile to analyze the set of raw data. In embodiments, generating the set of interpreted data using the first information source profile may include using the data interpretation dictionary to reference the set of information source profiles in order to identify a set of attributes for the set of interpreted data based on the characteristics of the information source, and subsequently use the set of attributes to interpret (e.g., contextualize, derive meaning from) the set of raw data. As an example, in response to receiving a set of raw data from an information source with an information source identification element of "stglumval14," the data interpretation dictionary may identify an information source profile associated with the information source identification element of "stglumval14," and use the identified profile to ascertain that the identification element "stglumval14" corresponds to a luminosity sensor associated with attributes of "data type-luminosity" and "unit of measurement-watts." Accordingly, the data interpretation dictionary may use the attributes identified from the information source profile to analyze the set of raw data and generate the set of interpreted data.

In embodiments, in response to ascertaining the absence of an information source profile corresponding to the first information source, a new information source profile associated with the information source identification element of the first information source may be established using the machine learning engine at block 544. Generally, establishing can include formulating, creating, instantiating, producing, assembling, structuring, arranging, or otherwise organizing the new information source profile corresponding to the first information source. In embodiments, establishing the new information source profile may include generating a new data entry in association with the information source identification element of the first information source in the collection of information source profiles. The machine learning technique may analyze the set of raw data to derive one or more attributes that characterize the information source or the manner in which the information source interacts with the network communication environment (e.g., the type of data it collects, the format the data is ingested in), and add this data to the newly created information source profile. As additional raw data is collected, the machine learning technique may continue to update the newly created information source profile as more information about the information source becomes known. Other methods of establishing the new information source profile are also possible.

Consider the following example. A set of raw data including a character sequence of "0008.0A14.C.27" is ingested by a data orchestration device having a data source identification element of "tempsensor18," and transmitted to the data orchestration platform. As described herein, the set of raw data may be analyzed using the data interpretation dictionary to generate a set of interpreted data. In particular, for example, the data interpretation dictionary may access a collection of information source profiles to ascertain whether an information source profile corresponding to the source identification element "tempsensor18" exists. For example, the data interpretation dictionary may compare the information source identification element "tempsensor 18" to the collection of information source profiles, and ascertain the presence of an information source profile linked with the information source identification element "tempsensor 18" (e.g., a profile corresponding to the data orchestration device exists). In embodiments, the information source profile may indicate that the data orchestration device corresponding to the data source identification element "tempsensor18" is a temperature sensor for a server in a data center, and that the raw data ingested from this temperature sensor is formatted in a character sequence in which the first four digits indicate the room number in which the server is located, the next four digits indicate the rack identifier and location in the rack, the next character indicates the measurement unit of the measured value, and the final two digits indicate the measured temperature value. Based on this information, the data interpretation dictionary may interpret that the raw data character sequence "0008.0A14.C.27" indicates that the server is located in the 14th position of server rack A in room number 8, and that the measured temperature value is 27 degrees Celsius. Accordingly, the data interpretation dictionary may generate the set of interpreted data based on the information indicated by the information source profile identified for the data orchestration device. Other methods of managing generation of the set of interpreted data using the set of information source profiles are also possible.

At block 560, an AI logic unit may be determined. At block 580, the set of interpreted data may be processed using the AI logic unit. Method 500 concludes at block 599. As described herein, aspects of method 500 relate to data orchestration platform management. Aspects of method 500 may provide performance or efficiency benefits related to data orchestration platform management. As an example, leveraging a machine learning model and a set of information source profiles may facilitate the interpretation of raw data and the dynamic selection of suitable AI logic units for data processing. Altogether, determining AI logic units based on the information source from which data was collected may be associated with benefits such as data utility, data reliability, and data orchestration platform performance and efficiency.

Figure 6:
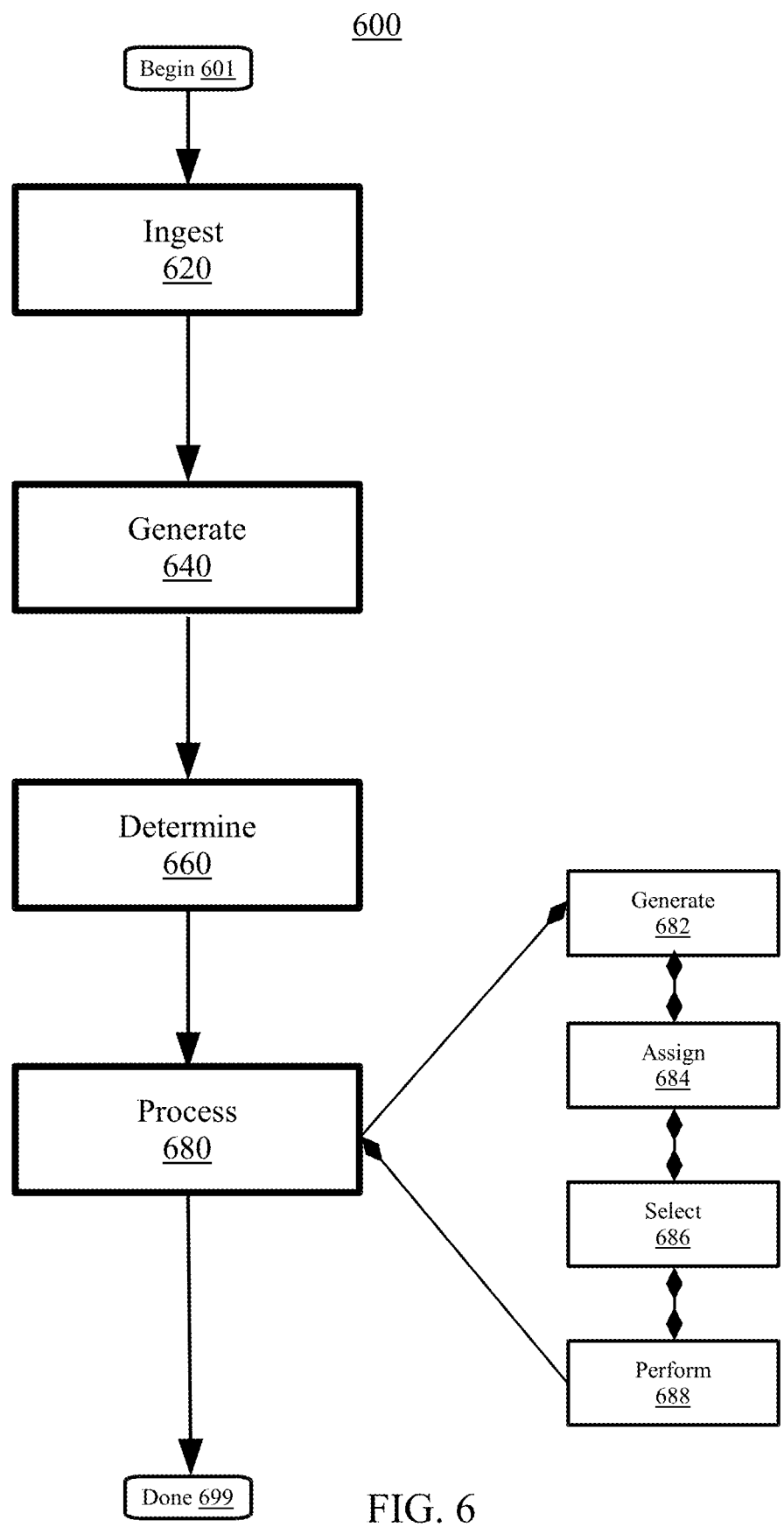
FIG. 6 is a flowchart illustrating a method of data orchestration platform management, according to embodiments.

FIG. 6 is a flowchart illustrating a method 600 of data orchestration platform management, according to embodiments. Aspects of method 600 relate to utilizing predictive analysis technique to generate a set of candidate predictive contexts, and performing a management operation with respect to the network communication environment based on one or more predictive contexts. In embodiments, aspects of method 600 may be similar or the same as aspects of methods 400 or 500, and aspects may be utilized interchangeably with one or more methodologies described herein. In embodiments, the method 600 may be performed subsequently to execution of the methods 400 or 500. The method 600 may begin at block 601. At block 620, a set of raw data may be ingested using a set of information sources. At block 640, a set of interpreted data may be generated using a data interpretation dictionary. At block 660, an AI logic unit may be determined to perform processing with respect to the set of interpreted data. At block 680, the set of interpreted data may be processed using the AI logic unit.

In embodiments, a set of candidate predicted contexts may be generated with respect to the network communication environment at block 682. The set of candidate predicted contexts may be generated using a predictive analysis technique configured to extract relationships between the set of interpreted data and a set of historical interpreted data. Generally, generating can include formulating, creating, instantiating, producing, assembling, structuring, arranging, organizing, or otherwise establishing the set of candidate predicted contexts. In embodiments, the set of candidate predicted contexts may include a set of potential lines of reasoning or rationales that serve to explain the background or situation in which the set of raw data was ingested in the network communication environment. For instance, the set of candidate predicted contexts may be inferences, hypotheses, or logical statements that explain patterns present in the raw data. As described herein, generating the set of candidate predicted contexts may include using a predictive analysis technique (e.g., linear regression models, logistic regression techniques, time series models, classification and regression trees, neural networks, support vector machines, Naive Bayes, k-nearest neighbors, geospatial predictive modeling) or the like to analyze a set of interpreted data with respect to a set of historical interpreted data (e.g., past interpreted data archived by the data orchestration platform), and identify relationships (e.g., trends, shared patterns, divergences) that explain the present set of interpreted data. Based on this analysis, the predictive analysis technique may produce a plurality of possible rationales (e.g., predictive contexts) with respect to the set of interpreted data. As an example, suppose that the voltage collected by a particular solar cell is experiencing a decreased collection voltage of approximately the same magnitude at a certain time each day. A set of interpreted data for the solar cell may be analyzed by the predictive analysis technique with respect to a set of historical interpreted data for voltage collection of the same solar cell, and a set of candidate predicted contexts of cloud obstruction (e.g., clouds preventing solar collection), wiring misconfiguration (e.g., loss due to resistance of the cable), soiling loss (e.g., loss due to dirt, dust, or snow covering the solar cell), and sun tracking loss (e.g., angle of the solar cell is not correctly tracking the movement of the sun). Other methods of generating the set of candidate predicted contexts are also possible.

In embodiments, in response to generating the set of candidate predicted contexts, a set of confidence values may be assigned for the set of candidate predicted contexts at block 684. Generally, assigning can include allocating, specifying, designating, allotting, or otherwise distributing the set of confidence values for the set of candidate predicted contexts. The set of confidence values may include a relative indication of the trustworthiness, reliability, or degree of accuracy of each of the set of candidate predicted contexts. For instance, the set of confidence values may be expressed as integer values between 0 and 100, wherein larger values indicate a greater degree of confidence, and lower values indicate a lesser degree of confidence. In embodiments, assigning the set of confidence values may include computing a value that represents the degree of correlation between a particular candidate predicted context and the patterns and trends of the set of historical interpreted data (e.g., candidate predicted contexts that have a higher degree of correlation to the patterns of the historical interpreted data are assigned higher confidence levels). As an example, referring to the previous example, the candidate predicted context of cloud obstruction may be assigned a confidence level of 45 (e.g., while possible, it is unlikely that clouds would decrease the collected voltage by the same amount at the same time each day), the candidate predicted context of a wiring misconfiguration may be assigned a confidence level of 8 (e.g., it is highly unlikely that a wiring malfunction would occur only at a particular time each day), the candidate predicted context of soiling loss may be assigned a confidence level of 32 (e.g., were the solar cell covered in dust, a constant decrease in voltage collection would be expected), and the candidate predicted context of sun tracking loss may be assigned a confidence level of 81 (e.g., an incorrect tracking angle of the solar cell could explain the decrease in the voltage collection at a particular time each day). Other methods of assigning the set of confidence values to the set of candidate predicted contexts are also possible.

In embodiments, a first candidate predicted context may be selected at block 686. The first candidate predicted context may be selected by comparing the set of confidence values for the set of candidate predicted contexts with a threshold confidence value. Generally, selecting can include choosing, ascertaining, electing, determining, or otherwise identifying the first candidate predicted context. The first candidate predicted context may include a particular candidate predicted context that has the greatest likelihood (e.g., highest confidence) of rationalizing the background conditions of a particular set of interpreted data. As described herein, the first candidate predicted context may be selected based on a comparison between the set of confidence values for the set of candidate predicted contexts and a threshold confidence value. The threshold confidence value may include a predetermined benchmark, stipulation, or requirement that indicates a minimum acceptable degree of confidence for the set of candidate predicted contexts. In embodiments, the threshold confidence value may be set by a user of the data orchestration platform (e.g., a user may designate a threshold confidence value of "80"). In certain embodiments, the threshold confidence value may indicate a minimum acceptable ranking of a candidate predicted context relative to other candidate predicted contexts (e.g., select the candidate predicted context with the highest confidence value). As an example, suppose that the threshold confidence value is set to a value of 85 (e.g., by a user). Accordingly, the candidate predicted context of cloud obstruction with the confidence level of 45, the candidate predicted context of a wiring misconfiguration with the confidence level of 8, the candidate predicted context of soiling loss with the confidence level of 32, and the candidate predicted context of sun tracking loss with the confidence level of 81 may be compared with respect to the threshold confidence value of 85, and the candidate predicted context of sun tracking loss may be selected as the first candidate predicted context (e.g., as it is the only candidate predicted context that achieves the threshold confidence value of 85, it may be determined to be the most likely context for the set of interpreted data). Other methods of selecting the first candidate predicted context are also possible.

In embodiments, a management operation with respect to the network communication environment may be performed based on the first candidate predicted context at block 688. The management operation may be performed using the data orchestration platform management engine. Generally, performing can include initiating, executing, instantiating, implementing, accomplishing, enacting, or otherwise carrying-out the management operation. The management operation may include an action, process, procedure, policy, activity, or behavior to facilitate performance of the data orchestration platform. As examples, the management operation, may include reconfiguring a data orchestration device (e.g., updating firmware, changing settings), adding or removing a data orchestration device (e.g., removing a malfunctioning sensor, installing a new sensor), providing a notification (e.g., to a user or network administrator), routing data traffic (e.g., changing a data routing path) or the like. In embodiments, the management operation to be performed with respect to the network communication environment may be selected based on the first candidate predicted context. For instance, in embodiments, the data orchestration platform management engine may reference a database of candidate predicted contexts and associated management operations, and determine a management operation that will be effective for the first candidate predicted context. As an example, with reference once again to the previous example, in response to selecting a first candidate predicted context of sun tracking loss, the data orchestration platform management engine may reference the database of candidate predicted contexts and select a management operation to recalibrate the angle of the solar cell (e.g., to accurately track the angle of the sun). Accordingly, the data orchestration platform management engine may execute the management operation with respect to the solar cell to facilitate performance of the data orchestration platform. Other methods of performing the management operation are also possible.

Method 600 concludes at block 699. As described herein, aspects of method 600 relate to data orchestration platform management. Aspects of method 600 may provide performance or efficiency benefits related to data orchestration platform management. As an example, performing a management operation in a dynamic fashion with respect to a data orchestration platform based on predicted contexts may facilitate flexible, real-time responses to the state of the network communication environment. Altogether, determining AI logic units based on the information source from which data was collected may be associated with benefits such as data utility, data reliability, and data orchestration platform performance and efficiency.

Figure 7:
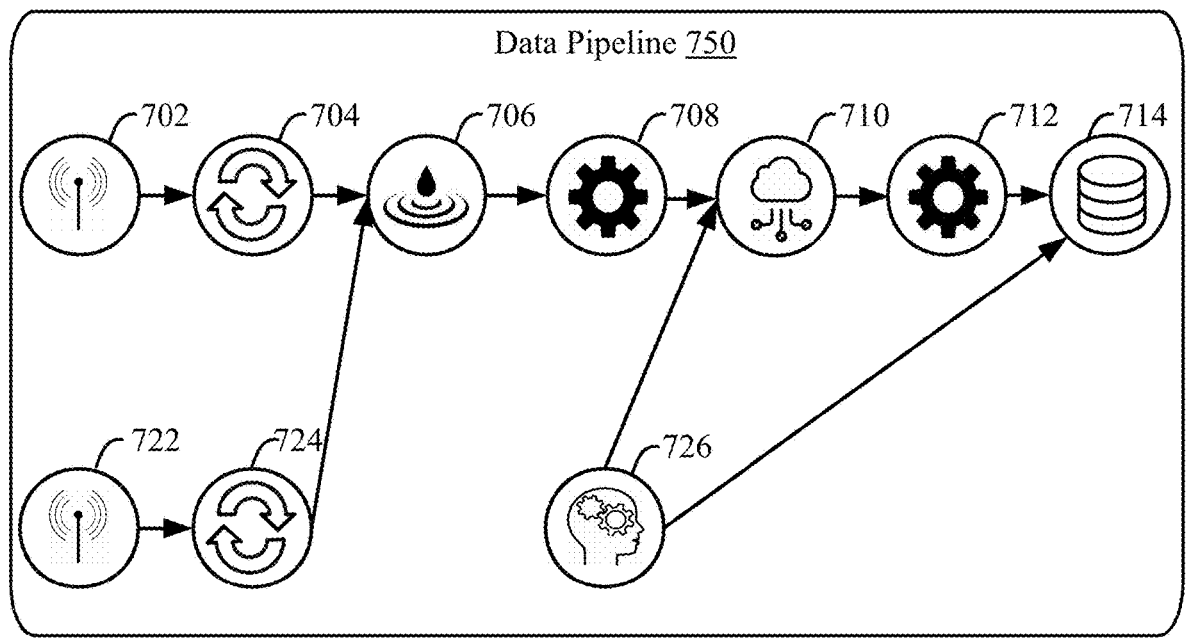
FIG. 7 is a diagram illustrating an example data pipeline for data orchestration platform management, according to embodiments.

FIG. 7 is a diagram illustrating an example data processing pipeline 750 for data orchestration platform management, according to embodiments. Aspects of FIG. 7 relate to structuring a data processing pipeline 750 including a set of AI logic units to perform processing operations with respect to the set of interpreted data. Generally, structuring can include building, creating, formulating, organizing, producing, composing, structuring, or otherwise establishing the data processing pipeline 750. The data processing pipeline 750 may include a series of communicatively connected assets configured to perform various processing operations on data ingested by the data orchestration platform. In embodiments, the data processing pipeline 750 may be implemented as an operator graph that defines an execution path for tuples in a stream computing environment.

As illustrated in FIG. 7, the data processing pipeline 750 may include a series of assets 702 to 726 for performing processing operations on data. Generally, the assets may include AI-logic units configured to perform predetermined processing operations on data ingested by the data orchestration platform. In embodiments, the assets of the data processing pipeline 750 may be visual representations of the various software modules and hardware components for carrying out the aspects of the method for data orchestration platform management described herein. For instance, as shown in FIG. 7, the data processing pipeline 750 may include information source assets 702, 722 (e.g., assets representing a particular information source, group or class of devices), optimization assets 704, 724 (e.g., assets for generating sets of interpreted data from raw data), a storage asset 706 (e.g., an asset for temporarily storing the interpreted data based on its attributes), processing assets 708, 712 (e.g., assets for sorting, categorizing, converting, and normalizing the set of interpreted data), a cloud analytics asset 710 (e.g., an asset for applying statistical or predictive analytics to the set of interpreted data), a big data asset 714 (e.g., an asset for generalizing, normalizing, and sharing insights from the data), and a machine learning asset 726 (e.g., an asset for applying machine learning techniques to the data and constructing a machine learning model). In embodiments, structuring the data processing pipeline 750 may include using the data orchestration platform management engine to automatically generate a recommended series of assets for processing of sets of raw data based on data processing pipelines utilized in the past for similar processing applications. In certain embodiments, structuring the data processing pipeline 750 may include providing a graphical user interface to a user or network administrator, and allowing the user/administrator to construct the data processing pipeline 750 using desired assets. Other methods of structuring the data processing pipeline 750 are also possible.

Figure 8:
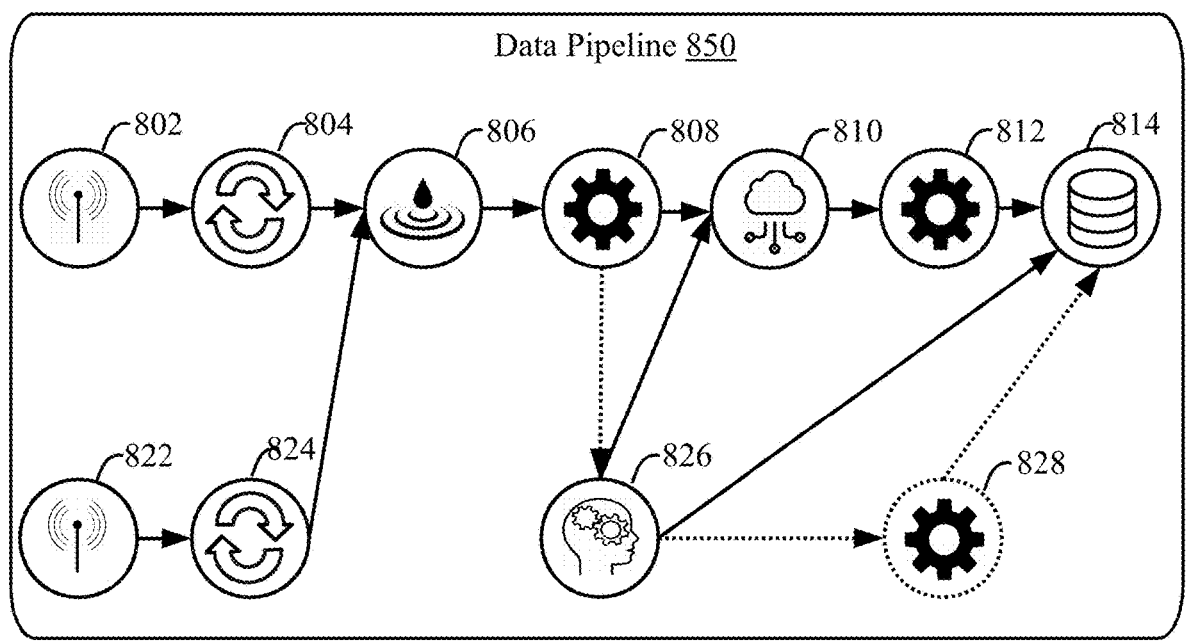
FIG. 8 is a diagram illustrating an example data pipeline for data orchestration platform management, according to embodiments.

FIG. 8 is a diagram illustrating an example data processing pipeline 850 for data orchestration platform management, according to embodiments. Aspects of FIG. 8 relate to modifying the data processing pipeline in a dynamic fashion by the data orchestration platform management engine using a machine learning model. As described herein, aspects of the disclosure relate to using a machine learning model to determine AI logic units to process sets of interpreted data in a dynamic and automated fashion. Accordingly, in certain embodiments, the data orchestration platform management engine may modify the data processing pipeline 850 based on the AI logic units determined by the machine learning model. As illustrated in FIG. 8, the data processing pipeline may include information source assets 802, 822, optimization assets 804, 824, a storage asset 806, processing assets 808, 812, 828, a cloud analytics asset 810, a big data asset 814, and a machine learning asset 826. The assets 802 to 828 of the data processing pipeline 850 may substantially correspond to the assets of the data processing pipeline 750, and as such a detailed description thereof is omitted herein.

In embodiments, modifying the data processing pipeline 850 may include revising, adding, subtracting, altering, adapting, customizing, correcting, updating, reconfiguring, or otherwise changing the data processing pipeline 850. In embodiments, modifying the data processing pipeline 850 may include adding a new asset (e.g., a new AI logic unit) and rerouting the flow of data through the data processing pipeline 850. In particular, as illustrated in FIG. 8, a new optimization asset 828 may be added to the data processing pipeline 850, and the data flow path may be modified such that data from the optimization asset 808 is transmitted to the machine learning asset 826, the optimization asset 828, and finally to the big data asset 814. As an example, the optimization asset 808 may be configured to identify a subset of a set of interpreted data for machine learning (e.g., using a set of machine learning usability criteria, as described herein), and route the subset of interpreted data to the machine learning asset 826 for analysis. Subsequently, as described herein, the machine learning asset 826 may determine to route the subset of interpreted data to the optimization asset 828 (e.g., an AI logic unit) to undergo processing before being transferred to the big data asset 814. In embodiments, the modifications to the data pipeline 850 may be made on-the-fly (e.g., additional AI logic units may be added in real time based on the nature of the interpreted data). Other methods of modifying the data pipeline 850 are also possible.

Figure 9:
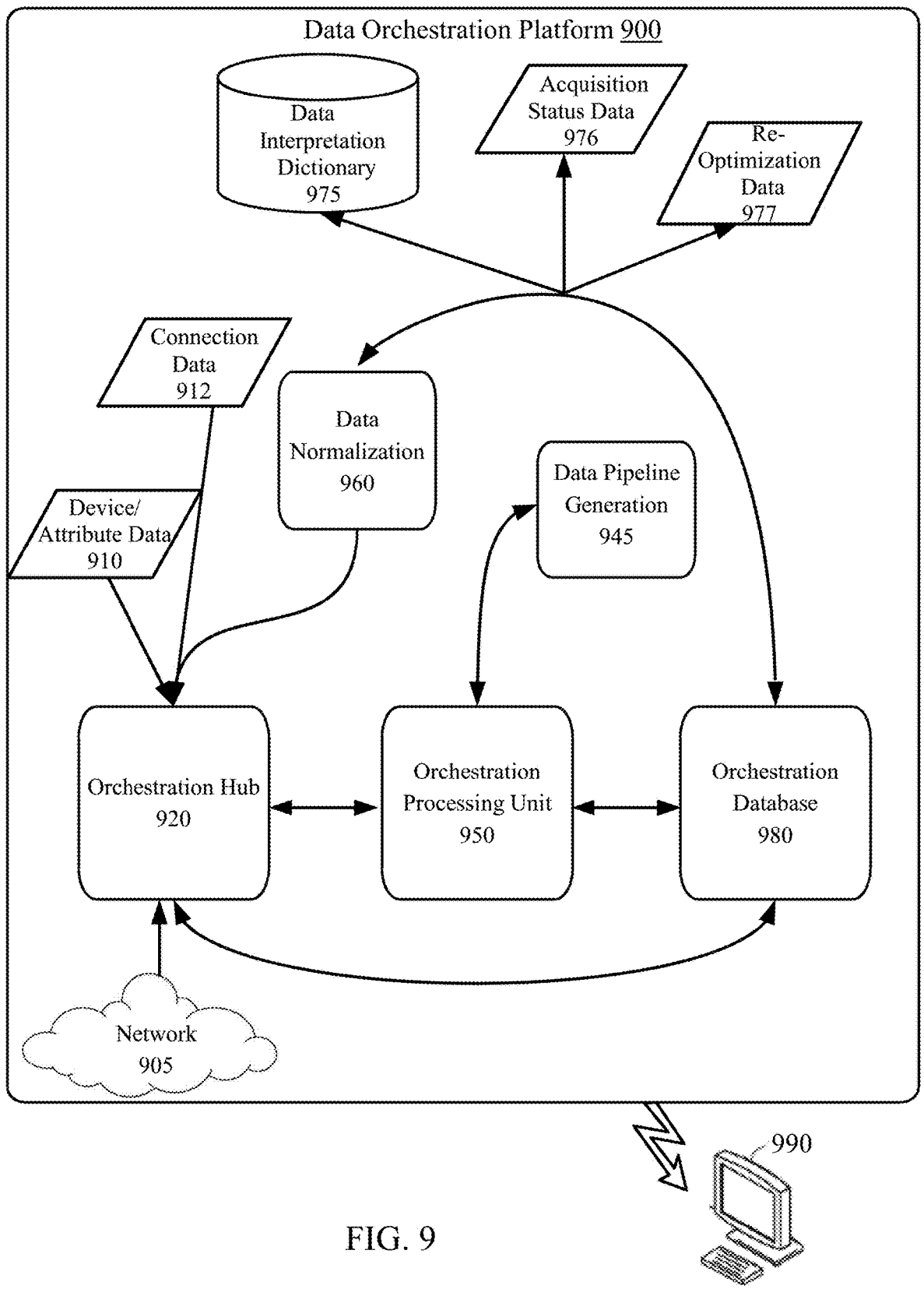
FIG. 9 is a diagram illustrating an example high-level system architecture of a data orchestration platform, according to embodiments.

FIG. 9 is a diagram illustrating an example high-level system architecture 900 of a data orchestration platform, according to embodiments. Aspects of FIG. 9 relate to a system architecture 900 for implementing various aspects of the data orchestration platform described herein. In embodiments, as described herein, the data orchestration platform may be communicatively connected to a network 905 (e.g., a network communication environment, Internet of Things network) including a set of information sources (e.g., sensors, users, devices). In certain embodiments, the system architecture 900 may be configured, managed, and structured using a management device 990 (e.g., computer, server, terminal, mobile device). The system architecture 900 may include an orchestration hub 920 configured to ingest data (e.g., set of raw data) from the information sources of the network 905. The orchestration hub 920 may be a software module or hardware component configured to monitor, collect, organize, and manage the data ingested from the network 905. In embodiments, as described herein, the orchestration hub 920 may be configured to map the raw data with a set of device attribute data and a set of connection data (e.g., using a set of information source profiles) to facilitate interpretation of the set of raw data. In certain embodiments, the set of raw data may be transmitted directly to an orchestration processing unit 950 for processing. For instance, the orchestration processing unit 950 may be configured to perform data pipeline generation 945 to structure a data pipeline for performing processing operations on the set of raw data. In certain embodiments, the set of raw data may be transmitted directly to an orchestration database 980 (e.g., an AI-based storage system) for storage and categorization. As illustrated in FIG. 9, in certain embodiments, the set of raw data may be processed using a data interpretation dictionary 975 (e.g., lexical resource configure to extract meaning from the set of raw data) to generate a set of interpreted data. In embodiments, generating the set of interpreted data may include utilizing a set of acquisition status data 976 (e.g., data characterizing the context in which the set of raw data was ingested) and a set of re-optimization data (e.g., data defining how past data was optimized and interpreted). Subsequently, the set of interpreted data may undergo data normalization 960 to be generalized and formatted. As described herein, the set of interpreted data may be returned to the orchestration hub 920 to provide feedback for future data analysis, transmitted to the orchestration processing unit 950 for further processing (e.g., determination of a management action), or stored in the orchestration database 980. Other types of system architecture 900 are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, source code, or an object oriented programming language such as Java, Smalltalk, C++ or the like. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer. In some embodiments, electronic circuitry including, for example, programmable logic circuitry, field-programmable gate arrays (FPGA), or programmable logic arrays (PLA) may execute the computer readable program instructions.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus, such that, when executed by the processor of the computer or other programmable data processing apparatus, the functions specified in the flowchart and/or block diagram blocks are implemented.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, steps, operations, elements, and/or components, but do not preclude the presence or addition of one or more other features, steps, operations, elements, components, and/or groups thereof.

In the previous detailed description of exemplary embodiments of the various embodiments, reference was made to the accompanying drawings (where like numbers represent like elements). These embodiments were described in sufficient detail to enable those skilled in the art to practice the embodiments, but other embodiments may be used and logical, mechanical, electrical, and other changes may be made without departing from the scope of the various embodiments.

Although the embodiments of the present invention have been described above through examples, these examples are merely for the purpose of explaining the present invention, and the scope of the present invention is not limited therein. Accordingly, the present invention can be implemented in various other forms.

What is claimed is:

1. A computer-implemented method for data orchestration platform management in a network communication environment including a set of data generating devices, the method comprising:
   obtaining, from the set of data generating devices, a set of raw data;
   generating, using a data interpretation dictionary configured to analyze the set of raw data, a set of interpreted data that indicates a set of attributes of the network communication environment or a set of identification elements of the data generating devices;
   comparing a collection of profiles characterizing a plurality of available artificial intelligence (AI) logic units with the set of attributes of the network communication environment or the set of identification elements of the data generating devices to select one or more AI logic units; and
   analyzing, using the one or more AI logic units, the set of interpreted data.

2. The method of claim 1, further comprising:
   identifying, by comparing the set of attributes of the set of interpreted data with a set of machine learning usability criteria in response to generating the set of interpreted data, a first subset of the set of interpreted data for machine learning; and routing, to a machine learning engine, the first subset of the set of interpreted data.

3. The method of claim 2, further comprising:

deriving, by the machine learning engine using a machine learning technique configured to analyze a subset of the set of attributes for the first subset of the set of interpreted data with respect to a set of AI logic units, a first processing rule indicating a first AI logic unit of the set of AI logic units to process the first subset of the set of interpreted data; and constructing, using the first processing rule, a machine learning model configured to manage AI logic unit selection for processing of the set of interpreted data.

4. The method of claim 3, further comprising:

utilizing, to determine the AI logic unit to perform processing with respect to the set of interpreted data, the machine learning model; and utilizing, by the data interpretation dictionary to analyze the set of raw data, a set of information source profiles for the set of data generating devices.

5. The method of claim 4, wherein the set of raw data includes both an information source identification element for a first information source of the set of data generating devices and a set of content data, and utilizing the set of information source profiles further comprises:

ascertaining, by comparing the information source identification element of the first information source with the set of information source profiles, a first information source profile corresponding to the first information source; and generating, in response to ascertaining the first information source profile corresponding to the first information source, the set of interpreted data using the first information source profile to analyze the set of raw data.

6. The method of claim 4, wherein the set of raw data includes both an information source identification element for a first information source of the set of data generating devices and a set of content data, and utilizing the set of information source profiles further comprises:

ascertaining, by comparing the information source identification element of the first information source with the set of information source profiles, absence of an information source profile corresponding to the first information source; and establishing, in response to ascertaining the absence of an information source profile corresponding to the first information source, a new information source profile associated with the information source identification element of the first information source using the machine learning engine.

7. The method of claim 5, wherein the set of content data includes one or more selected from the group consisting of a set of textual data, a set of image data, set of audio data, a set of video data, a measured value, a set of biometric data, a set of status information, or a set of location information.

8. The method of claim 5, wherein the set of attributes includes one or more selected from the group consisting of a data type, a semantic factor, a time stamp, a unit of measurement, a confidence value, or a severity level.

9. The method of claim 1, wherein analyzing the set of interpreted data using the one or more AI logic units further comprises:

generating, using a predictive analysis technique configured to extract relationships between the set of interpreted data and a set of historical interpreted data, a set of candidate predicted contexts with respect to the network communication environment; and assigning, in response to generating the set of candidate predicted contexts, a set of confidence values for the set of candidate predicted contexts.

10. The method of claim 9, further comprising:

selecting, by comparing the set of confidence values for the set of candidate predicted contexts with a threshold confidence value, a first candidate predicted context that achieves the threshold confidence value; and performing a management operation based on the first candidate predicted context.

11. The method of claim 1, further comprising:

structuring a data processing pipeline including a set of AI logic units to perform processing operations with respect to the set of interpreted data.

12. The method of claim 11, further comprising:

modifying, in a dynamic fashion by using a machine learning model configured to manage AI logic unit selection for processing of the set of interpreted data, the data processing pipeline.

13. The method of claim 1, further comprising:

storing, in an AI-based data storage system, the set of interpreted data in an output data type based on the set of attributes.

14. The method of claim 1, further comprising:

executing, in a dynamic fashion to streamline data orchestration platform management, each of: the obtaining, the generating, the comparing, and the analyzing.

15. The method of claim 1, further comprising:

executing, in an automated fashion without user intervention, each of: the obtaining, the generating, the comparing, and the analyzing.

16. A system for data orchestration platform management in a network communication environment including a set of data generating devices, the system comprising:

a memory having a set of computer readable computer instructions, and a processor for executing the set of computer readable instructions, the set of computer readable instructions including:

obtaining, using the set of data generating devices, a set of raw data;

generating, using a data interpretation dictionary configured to analyze the set of raw data, a set of interpreted data that indicates a set of attributes for the network communication environment or a set of identification elements of the data generating devices;

comparing a collection of profiles characterizing a plurality of available artificial intelligence (AI) logic units with the set of attributes for the network communication environment or the set of identification elements of the data generating devices to select one or more AI logic units; and analyzing, using the one or more AI logic units, the set of interpreted data.

17. A computer program product for data orchestration platform management in a network communication environment including a set of data generating devices, the computer program product comprising a computer readable storage medium having program instructions embodied therewith, wherein the computer readable storage medium is not a transitory signal per se, the program instructions executable by a processor to cause the processor to perform a method comprising:

obtaining, using the set of data generating devices, a set of raw data;

generating, using a data interpretation dictionary configured to analyze the set of raw data, a set of interpreted data that indicates a set of attributes for the network communication environment or a set of identification elements of the data generating devices;

comparing a collection of profiles characterizing a plurality of available artificial intelligence (AI) logic units with the set of attributes for the network communication environment or the set of identification elements of the data generating devices to select one or more AI logic units; and analyzing, using the one or more AI logic units, the set of interpreted data.

18. The computer program product of claim 17, further comprising:

identifying, by comparing the set of attributes of the set of interpreted data with a set of machine learning usability criteria in response to generating the set of interpreted data, a first subset of the set of interpreted data for machine learning; and routing, to a machine learning engine, the first subset of the set of interpreted data.

19. The computer program product of claim 17, wherein the program instructions are stored in a computer readable storage medium in a data processing system, and the program instructions were downloaded over a network from a remote data processing system.

20. The computer program product of claim 17, wherein the program instructions are stored in a computer readable storage medium in a server data processing system, and the program instructions are downloaded over a network to a remote data processing system for use in a computer readable storage medium with the remote data processing system.

* * * * *